United States Patent
Wang et al.

(10) Patent No.: US 12,174,087 B2
(45) Date of Patent: Dec. 24, 2024

(54) NECK BRACKET DESIGN FOR ANTHROPOMORPHIC TEST DEVICE IN MULTIPLE RECLINED SEATING POSTURES

(71) Applicant: Humanetics Innovative Solutions, Inc., Farmington Hills, MI (US)

(72) Inventors: Zhenwen J. Wang, Farmington Hills, MI (US); Joseph P. McInnis, New Hudson, MI (US)

(73) Assignee: Humanetics Innovative Solutions, Inc., Farmington Hills, MI (US)

( * ) Notice: Subject to any disclaimer, the term of this patent is extended or adjusted under 35 U.S.C. 154(b) by 824 days.

(21) Appl. No.: 17/276,648

(22) PCT Filed: Sep. 23, 2019

(86) PCT No.: PCT/US2019/052469
§ 371 (c)(1),
(2) Date: Mar. 16, 2021

(87) PCT Pub. No.: WO2020/061572
PCT Pub. Date: Mar. 26, 2020

(65) Prior Publication Data
US 2022/0042880 A1    Feb. 10, 2022

Related U.S. Application Data

(60) Provisional application No. 62/864,710, filed on Jun. 21, 2019, provisional application No. 62/734,594, filed on Sep. 21, 2018.

(51) Int. Cl.
*G01M 17/007*    (2006.01)
*G09B 23/32*    (2006.01)
*G09B 23/34*    (2006.01)

(52) U.S. Cl.
CPC ......... *G01M 17/0078* (2013.01); *G09B 23/32* (2013.01); *G09B 23/34* (2013.01)

(58) Field of Classification Search
CPC ......... G09B 23/34; G09B 23/30; G09B 23/32
See application file for complete search history.

(56) References Cited

U.S. PATENT DOCUMENTS 3,707,782 A    1/1973    Alderson
3,740,871 A    6/1973    Berton et al.
(Continued)

FOREIGN PATENT DOCUMENTS

CN    101354849 A    1/2009
EP    3040961 A1    7/2016
(Continued)

OTHER PUBLICATIONS

International Search Report for Application No. PCT/US2019/052469 dated Dec. 10, 2019, 1 page.
(Continued)

*Primary Examiner* — Judy Nguyen
*Assistant Examiner* — James Split
(74) *Attorney, Agent, or Firm* — Howard & Howard Attorneys PLLC

(57) ABSTRACT

An anthropomorphic test device includes a spine assembly defining a spinal axis; a neck assembly coupled to a head assembly; and a neck bracket assembly coupling the neck assembly to the spine assembly. The neck bracket assembly has a base secured to the spine assembly with a base plane transverse to the spinal axis and a mount secured to the neck assembly and coupled to the base with the spinal axis passing through said mount. A pivot mechanism is secured to the base and mount with the neck and head assemblies pivoting relative to the base and spine assembly in a plurality of head positions. The mount has upper and lower surfaces (Continued)

angled to each other with one of the upper and lower surfaces being positioned at an angle relative to the base plane in all of the plurality of head positions.

18 Claims, 20 Drawing Sheets

(56) References Cited

U.S. PATENT DOCUMENTS

| | | | |
|---|---|---|---|
| 3,762,069 A | 10/1973 | Culver | |
| 3,877,156 A | 4/1975 | Itoh | |
| 3,962,801 A | 6/1976 | Gonzalez | |
| 5,152,692 A | 10/1992 | Richards | |
| 5,259,765 A | 11/1993 | Richards | |
| 5,463,825 A | 11/1995 | Lo | |
| 6,310,619 B1 | 10/2001 | Rice | |
| 6,422,874 B1 | 7/2002 | Green et al. | |
| 7,204,165 B1 | 4/2007 | Plaga et al. | |
| 7,247,079 B2 | 7/2007 | Maar | |
| 7,878,080 B2 | 2/2011 | Hwang et al. | |
| 7,963,598 B2* | 6/2011 | Akaike | B60N 2/865 297/216.12 |
| 8,086,430 B2* | 12/2011 | Thomas | G06F 30/15 703/8 |
| 8,612,191 B2* | 12/2013 | Namiki | G06F 30/15 703/7 |
| 9,564,069 B2 | 2/2017 | Wang | |
| 9,947,244 B2 | 4/2018 | Wang et al. | |
| 9,965,977 B2 | 5/2018 | Been et al. | |
| 9,972,220 B2 | 5/2018 | Wang | |
| 9,981,569 B2* | 5/2018 | Frasher | B60N 2/0252 |
| 2011/0027767 A1 | 2/2011 | Divinagracia | |
| 2014/0259532 A1* | 9/2014 | Millard | E05D 11/1028 16/326 |
| 2016/0140879 A1 | 5/2016 | Hananel et al. | |
| 2016/0189569 A1 | 6/2016 | Been | |
| 2016/0189571 A1 | 6/2016 | Wang | |
| 2016/0245726 A1 | 8/2016 | Nishigaki et al. | |
| 2017/0249870 A1 | 8/2017 | Shah | |
| 2018/0136083 A1 | 5/2018 | Wang et al. | |

FOREIGN PATENT DOCUMENTS

| | | |
|---|---|---|
| GB | 2344922 A | 6/2000 |
| WO | 2012044225 A1 | 4/2012 |
| WO | 2019075582 A1 | 4/2019 |
| WO | 2019155193 A1 | 8/2019 |

OTHER PUBLICATIONS

Youtube, "Netter's Interactive Anatomy and Elsevier's 3D Interactive Anatomy", Elsevier Clinical Solutions, https://www.youtube.com/watch?v=BAo2OhxWuHE, Sep. 24, 2009, 3 pages.
English language abstract for CN 101354849 A extracted from espacenet.com database on Mar. 1, 2023, 1 page.
Chinese Search Report for Application CN 2019800728556 dated Mar. 1, 2023, 3 pages.

* cited by examiner

NECK BRACKET DESIGN FOR ANTHROPOMORPHIC TEST DEVICE IN MULTIPLE RECLINED SEATING POSTURES

CROSS-REFERENCE TO RELATED APPLICATIONS

The present invention is the National Stage of International Patent Application PCT/US2019/052469 filed Sep. 23, 2019 which claims priority to International Application No. PCT/US2019/052469, filed Sep. 23, 2019, which claims priority to U.S. Provisional Application Ser. No. 62/734,594, filed Sep. 21, 2018 and U.S. Provisional Application Ser. No. 62/864,710, filed Jun. 21, 2019, the contents of which are herein incorporated by reference in their entirety.

BACKGROUND OF THE INVENTION

1. Field of the Invention

The present invention relates generally to anthropomorphic test devices and, more particularly, to a neck bracket design for an anthropomorphic test device.

2. Description of the Related Art

In the past few decades of anthropomorphic test device (ATD) design, the ATD (also referred to as a "crash test dummy") was designed to seat in a driving posture only for crash testing in vehicle development to comply with Federal Motor Vehicle Safety Standard (FMVSS).

With the emerging autonomous driving system (ADS) technology being developed for automated vehicles, however, a driver is no longer needed to drive the vehicle. In particular, with the ADS technology, there are opportunities to have alternative seating packages, such as where four riding occupants (2 front and 2 rear occupants) are sitting forward, or where the two front occupants are sitting rearward to face the occupants in rear seats, for where the four occupants are sitting against each other diagonally, etc. depending on the interactions among the occupants.

However, in current ATD designs, it is generally not feasible to have a human-like spine that can form to the shape of the human due to the complexity of human body structure and muscle function in these various seating packages. Instead, pivot joints have been introduced into the ATD spine design to allow bending the spine in limited range of motion to approximate the human spine curvature. This has been proven generally successful for the standard driving or riding postures with seatback angle at 23 degrees (which corresponds to a spinal angle of the ATD of 23 degrees relative to a vertical plane). However, ATD in reclined occupant seating postures, with seatback angles of up to 60 degrees, has not been required in FMVSS testing and approached as part of the ATD design.

The present invention provides a coupling design to address this issue.

SUMMARY OF THE INVENTION

The present disclosure is directed is directed to a neck bracket assembly for use in an anthropomorphic test device, or crash test dummy. In particular, the present disclosure is directed to anthropomorphic test device including a spine assembly with a length of the spine assembly defining a spinal axis, a neck assembly coupled to the spine assembly at one end, a head assembly coupled to the neck assembly at another end of the neck assembly, and a neck bracket assembly coupling the neck assembly to the spine assembly. The neck bracket assembly includes a base secured to the spine assembly with the base defining a base plane transverse to the spinal axis. The neck bracket assembly also includes a mount secured to the neck assembly and coupled to the base with the spinal axis passing through the mount. The neck bracket assembly also includes a pivot mechanism having a first portion secured to the base and a second portion secured to the mount with the neck and head assemblies pivoting relative to the base and the spine assembly in a plurality of head positions. The neck bracket assembly also includes wherein the mount has an upper surface angled relative to a lower surface to define a wedge-shaped configuration with one of the upper and lower surfaces being positioned at an angle relative to the base plane in all of the plurality of head positions.

The present disclosure also provides an associated method of positioning the head and neck assemblies of the anthropomorphic test device in a desired head and neck position from a plurality of head positions when the anthropomorphic test device is positioned at either a 23-degree seatback angle relative to a vertical plane, representative of a normal seating posture for a driver of a vehicle, or a 60-degree seatback angle relative to a vertical plane, representative of a super-reclined seating posture for a passenger in a vehicle, or an seatback angle therebetween.

Together with the joints in the thoracic spine assembly, the neck bracket assembly of the present invention provides a function that correctly positions the head and neck assembly of the anthropomorphic test device in a desired position such that the anthropomorphic test device can be positioned in a position simulating a human-like position collision testing regardless of the seatback angle provided.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1A:
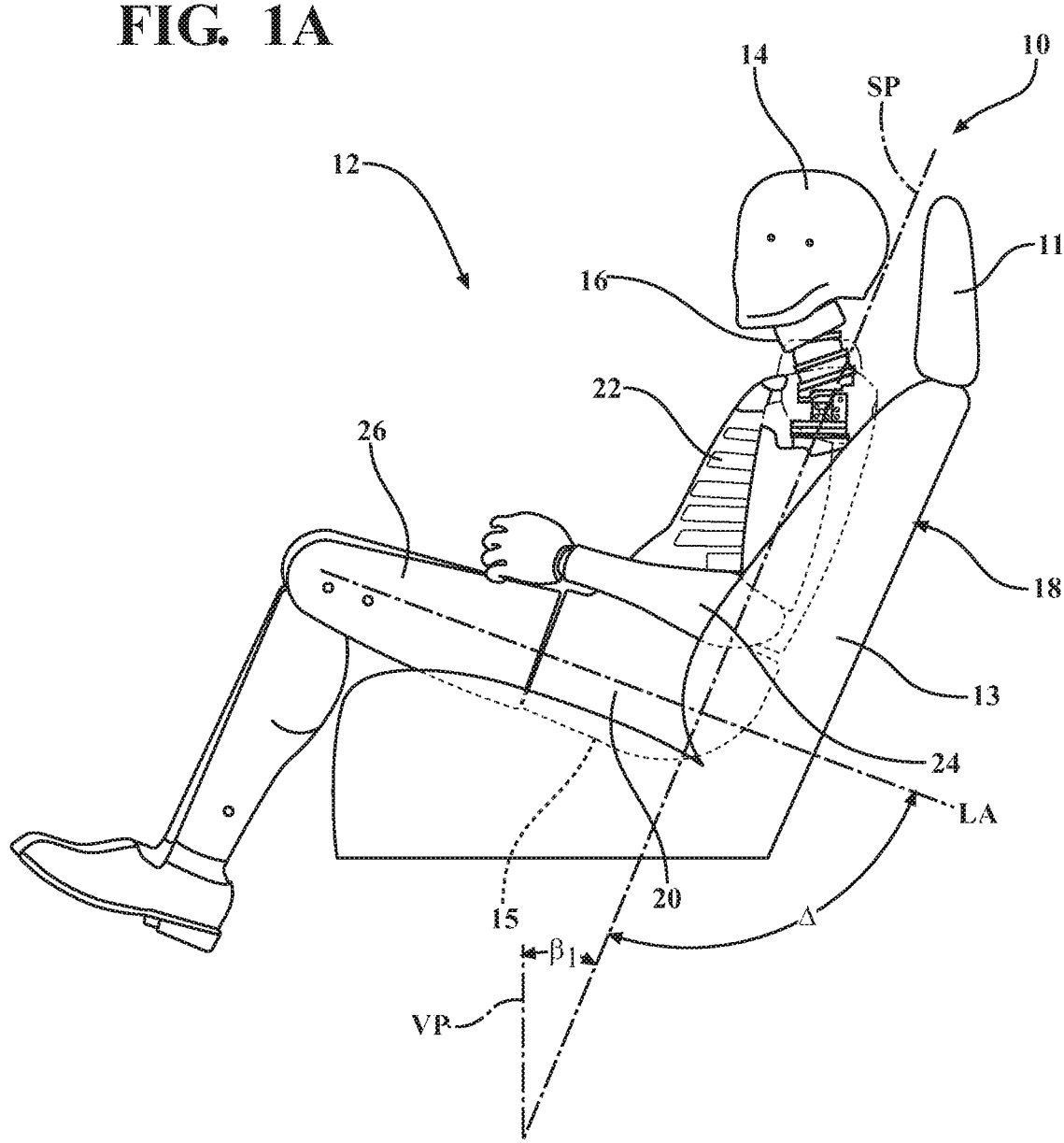
FIG. 1A is a side view of one embodiment according to the present invention, illustrating the positioning of an anthropomorphic test device, or crash test dummy, with the spinal plane set at the 23-degree seatback position relative to the vertical plane and with the upper planar surface of the mount set at an initial angle relative to a base plane and with the head and neck assembly in a desired one of the plurality of head positions relative to the vertical plane to correspond to a normal driving position.
Figure 1B:
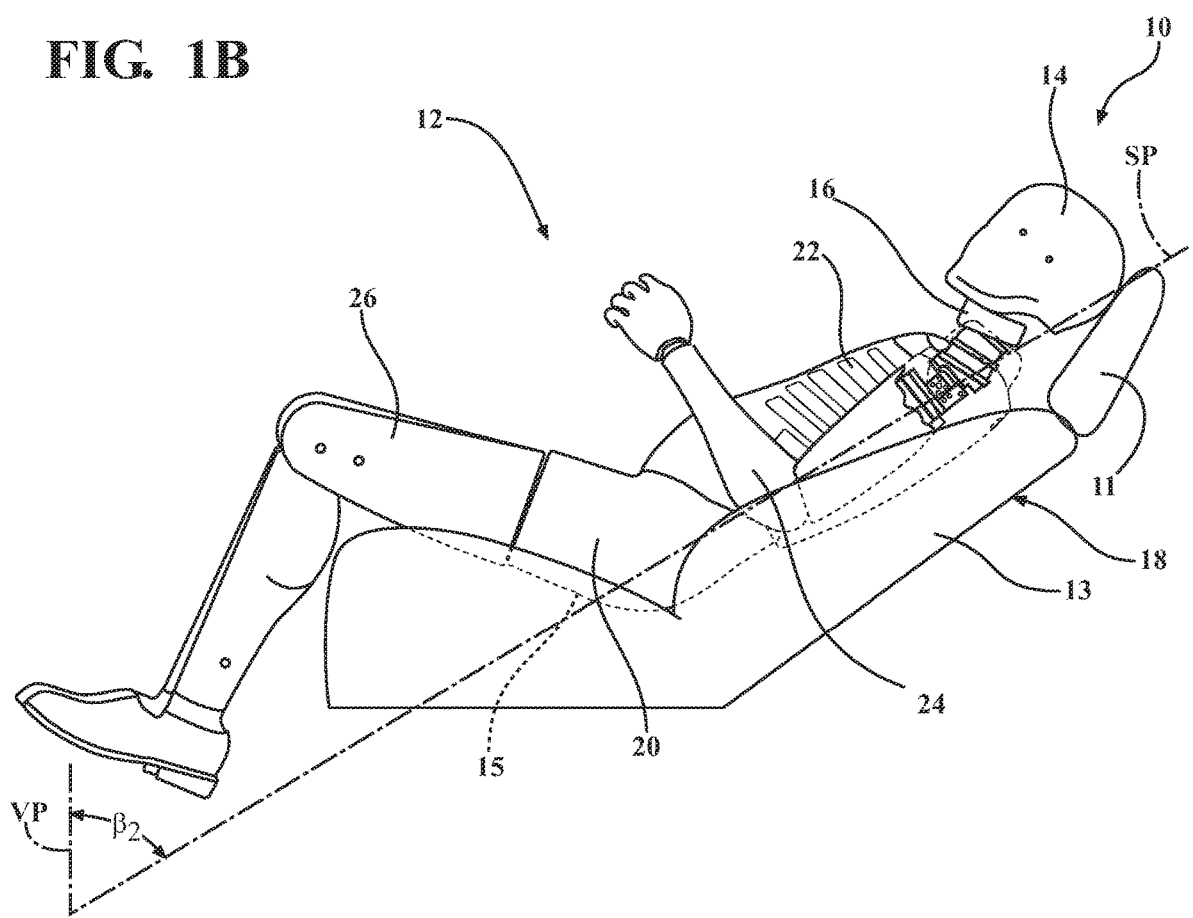
FIG. 1B is a side view of a portion of the anthropomorphic test device of FIG. 1A with the spinal plane repositioned at the 60-degree seatback position relative to the vertical plane and with the upper planar surface of the mount set at an initial angle relative to a base plane to correspond to a super-reclined position.
Figure 2:
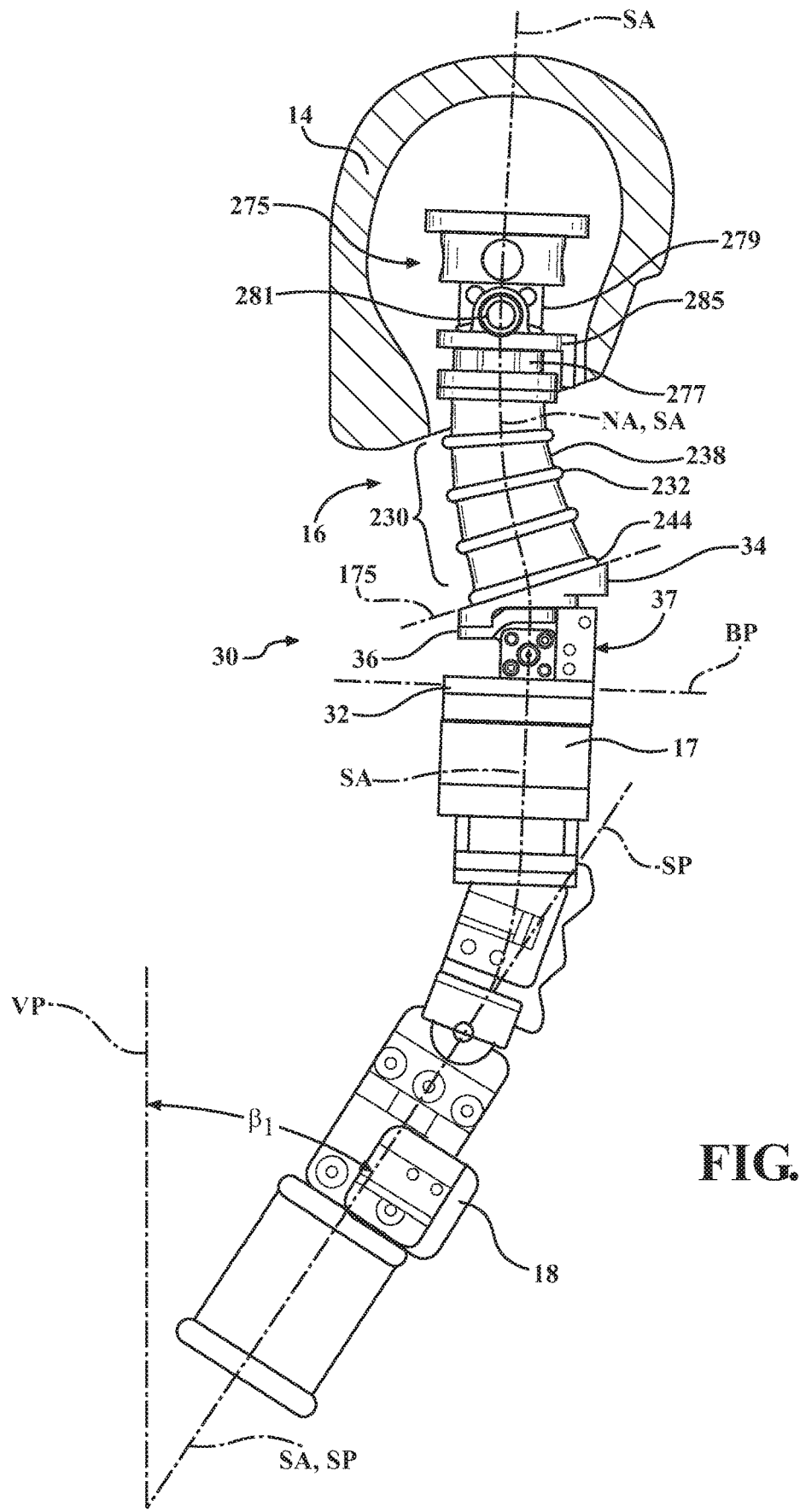
FIG. 2 is a side perspective view of a portion of the anthropomorphic test device of FIG. 1A.
Figure 3:
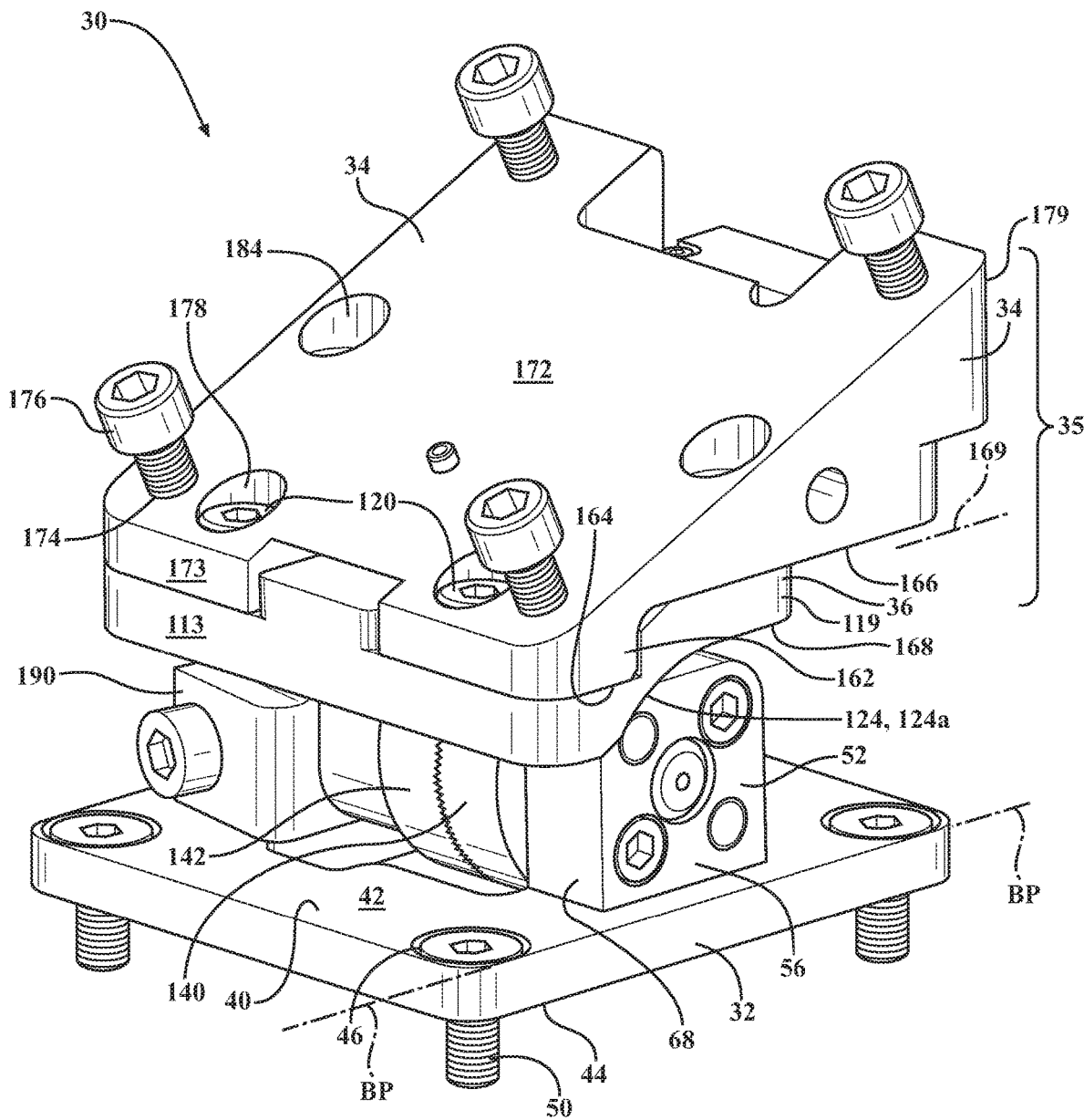
FIG. 3 is a front perspective view of the neck bracket assembly of FIG. 2 in an assembled state according to one embodiment.
Figure 4:
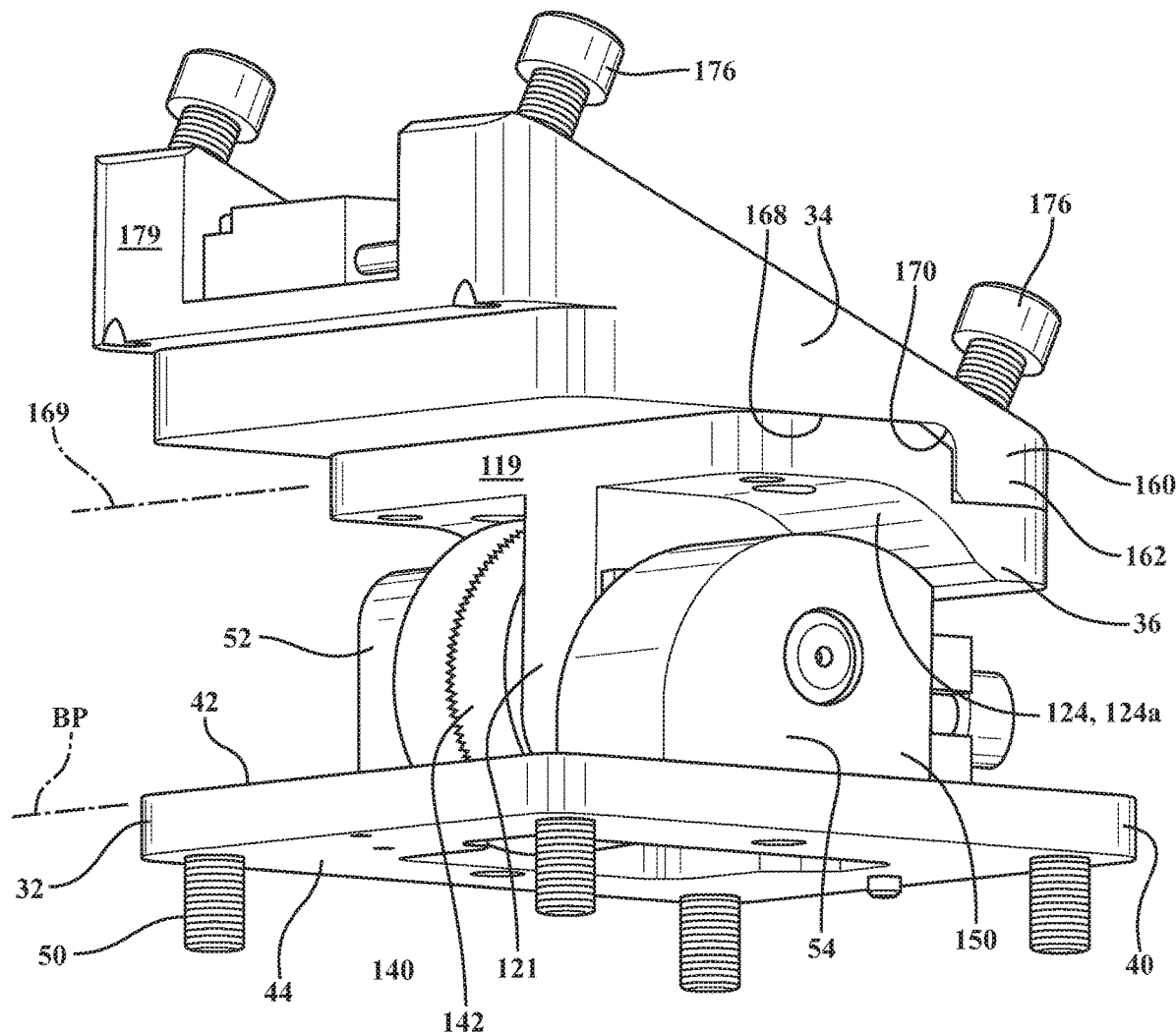
FIG. 4 is a rotated view of FIG. 3.
Figure 5:
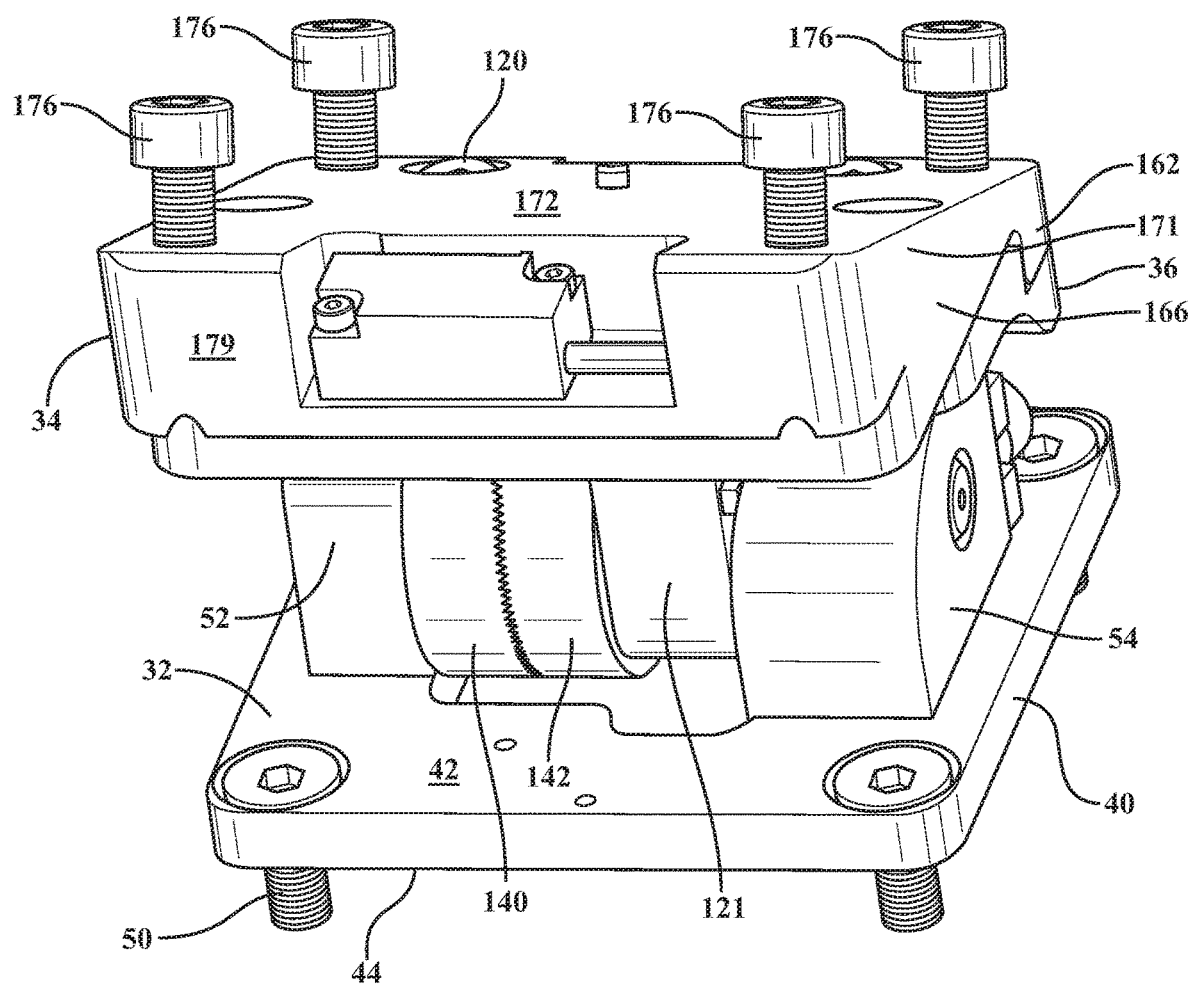
FIG. 5 is another rotated view of FIG. 3
Figure 6:
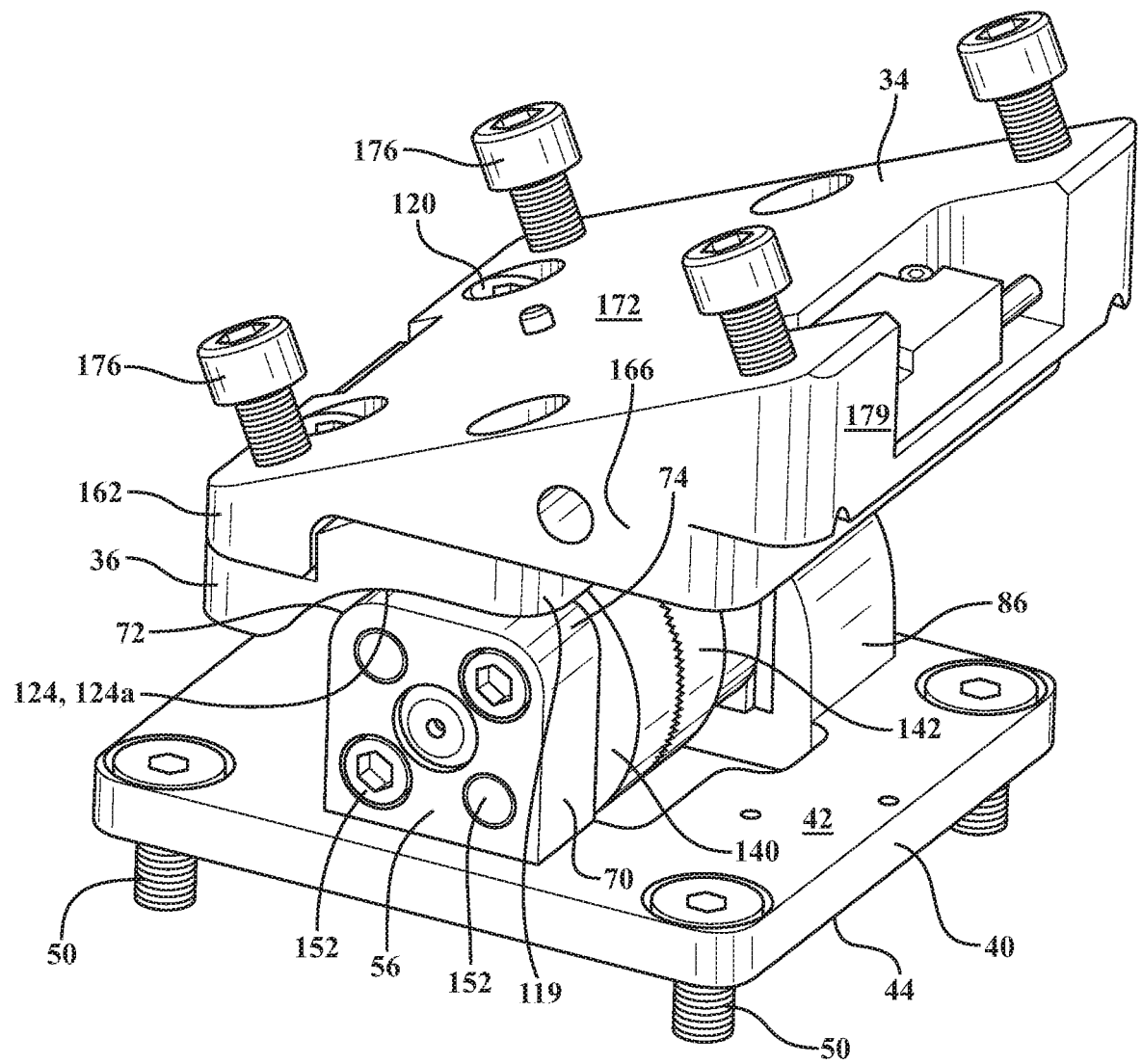
FIG. 6 is yet another rotated view of FIG. 3.

Referring to the drawings and in particular FIGS. 1A and 1B, one embodiment of anthropomorphic test device, or crash test dummy 12, is generally indicated as 12 and is shown positioned on a seat assembly 10.

The seat assembly 10 includes a head rest portion 11, a seatback portion 13, and a seat portion 15. The seatback portion 13 of seat assembly 10 is capable of being reclined between multiple seatback angles relative to the seat portion 15 (i.e., multiple reclining positions), with the seatback angle corresponding to the number of degrees in which the spinal plane SP of the crash test dummy 12 is angled relative to a vertical position in its current position. One representative seatback position, a 23-degree seatback angle β1 as illustrated in representative FIG. 1A. The seatback angle, as used herein, is defined as an angle between a vertical plane VP and a spinal plane SP of the anthropomorphic test device 12 in its current positioning relative to the environment (typically when seated on the seat assembly 10 as illustrated in FIGS. 1A and 1B), with the spinal plane SP defined along the length of the bottom portion of the spine assembly 18. The seatback angle β1, represented at 23 degrees relative to the vertical plane VP in FIG. 1A, generally corresponds to a driving or riding posture for a driver or passenger of a vehicle. Reclined seatback angles β2, such as those up to about 60 degrees relative to the vertical plane VP are also contemplated with the crash test dummy 12 as described herein and typically correspond to a seatback angle of a passenger in a vehicle, or for a driver and/or a passenger in an autonomous vehicle. In most instances, and as illustrated herein in FIGS. 1A and 1B, the spinal plane SP of the crash test dummy 12 extends parallel to a plane extending through the middle of the seatback portion 13 along its length, although the spinal plane SP may be slightly angled relative to the plane extending through the seatback portion 13.

The seatback angles β1 and β2, respectively, as shown in FIGS. 1A are 1B (and also in FIGS. 2, 10A-C, and 16A-B), while intended to show a 23-degree and 60-degree seatback angle relative to the vertical plane, are illustrative in nature and not intended to illustrate the precise actual measurement. In other words, the seatback angle β1 depicted in FIG. 1A is intended to represent a 23-degree seatback angle, while the seatback angle β2 depicted in FIG. 1A is intended to represent a 60-degree seatback angle even if the figures do not precisely illustrate the respective seatback positions.

The crash test dummy 12 is of a fiftieth percentile (50%) male type and is illustrated in a sitting position. This crash test dummy 12 is used primarily to test the performance of automotive interiors and restraint systems for adult front and rear seat occupants. The size and weight of the crash test dummy 12 are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data.

As also illustrated in FIGS. 1A and 1B, the crash test dummy 12 includes a head assembly, generally indicated at 14. The crash test dummy 12 also includes a neck assembly 16 mounted to and extending from the head assembly 14. The crash test dummy 12 also includes a spine assembly, generally indicated at 18 (see FIGS. 2, 10A-C, and 16A-B), having a lower end extending into a torso area of the crash test dummy 12. The spine assembly 18 defines a curved spinal axis SA along its length that is different from the spinal plane SP, with the spinal axis SA extending in a direction normal to the neck assembly 16 at the interface of the spine assembly 18 and neck assembly 16. Owing to the fact that the neck assembly 16 can be considered as an upper part of the spine assembly, the spinal axis SA as illustrated also extends upward through the neck assembly 16 and into the head assembly 14.

The crash test dummy 12 further includes a pelvis assembly 20 coupled to the lower end of the spine assembly 18. The torso area of the crash test dummy 12 also includes a rib cage assembly, generally indicated at 22, connected to the spine assembly 18. The crash test dummy 12 also has a pair of arm assemblies including a left arm assembly, generally indicated at 24, and a right arm assembly (not shown), which are attached to the crash test dummy 12. The crash test dummy 12 further includes a pair of leg assemblies including a left leg assembly, generally indicated at 26 and a right leg assembly (not shown), which are coupled to the pelvis assembly 20. The leg assemblies define a leg axis LA which intersects the spinal plane SP at a position within the pelvis assembly 20, with the leg axis LA and the spinal plane SP defining an angle Δ therebetween. Depending upon the configuration of the seat portion 15, the leg axis LA runs parallel to the length of the seat portion 15 when the anthropomorphic test device 12 is placed on the vehicle seat during collision testing.

It should be appreciated that various components of the crash test dummy 12 are covered in a urethane skin such as a flesh and skin assembly (partially shown) for improved coupling with the skeleton of the crash test dummy 12.

As also shown in FIGS. 2, 10A-C, and 16A-B, the neck assembly 16 includes a plurality of modular vertebra segments, generally indicated at 230. Each vertebra segment 230 includes a vertebra disc 232 and includes a joint element 238 disposed between each respective pair (i.e., adjacent) of vertebra discs 232. The neck assembly 16 includes a lower mounting plate 244, which may alternatively be referred to as the lowermost one 244 of the vertebra discs 232. The neck assembly 16 also includes an uppermost one 233 of the upper vertebra discs 232 (i.e., the uppermost vertebra disc 233) at an upper end of one of the joint elements 238.

In certain embodiments, as also shown in FIGS. 2, 10A-C, and 16A-B, an upper neck/head pivotable bracket assembly 275 is coupled onto the uppermost one 233 of the upper vertebra discs 232. The assembly 275 includes base member 277 coupled to the uppermost one 233 of the vertebra discs 232 and an upper member 279 which is mounted to the head assembly 14 and includes a pivot mechanism 281 which allows the upper member 279 coupled to the head assembly 14 to pivot relative to the base member 277 and neck assembly 16. In certain embodiments, the assembly 275 also includes a torsion element 285 which allows a portion of the assembly to pivot relative to another portion of the assembly about an axis, with the axis generally corresponding to the spinal axis SA provided herein.

The crash test dummy 12 also includes a neck bracket assembly 30 for coupling the neck assembly 16 to the spine assembly 18. The disclosure herein includes two embodiments, of the neck bracket assembly 30, with the first embodiment illustrated in FIGS. 3-10 and the second embodiment illustrated in FIGS. 11-16. In each of the two embodiments, as will be described in further detail below, the neck bracket assembly 30 allows for the neck and head assemblies 16, 14 to pivot relative to the uppermost part of the spine assembly 18 to orient the head assembly 14 in a desired one of a plurality of head positions relative to the vertical plane VP at any respective seatback angle between the seatback angle β1, corresponding to the normal riding posture, and the maximum seatback angle β2, corresponding to the super-reclined seatback angle, as described above.

Each of the embodiments of the neck bracket assembly 30 described below, the neck bracket assembly 30 includes many common components, including a base 32, a first bracket 36, a second bracket 34, and a pivot mechanism 37, and are therefore described and illustrated with the same numbers representing the same part in each embodiment. Although depicted as separate first and second brackets 36, 34 coupled together in FIGS. 3-16, the brackets 36, 34 can collectively be referred to as a mount 35. In the first embodiment described below, as shown in FIGS. 3-10, the first and second brackets 36, 34 defining the mount 35 may be formed as a single piece (i.e., the first and second bracket 36, 34 are integrally formed). For ease of manufacture and assembly, however, the first and second brackets 36, 34 are typically two separate pieces, and the description of the neck bracket assembly 30 disclosed in this embodiment of FIGS. 3-10 describes them as two separate pieces. In the second embodiment, the first and second brackets 36, 34 are separate pieces, having two distinct mounting configurations, as will also be described below.

Referring now to one embodiment of the neck bracket assembly 30, as best shown in FIGS. 3-10, the assembly 30 includes a base 32 that is configured for securing the neck bracket assembly 30 to the uppermost portion 17 of the spine assembly 18 opposite the head assembly 14 and neck assembly 16. The neck bracket assembly 30 also includes a second bracket 34 that is configured for securing the neck bracket assembly 30 to the lowermost portion of the neck assembly 16, shown in FIG. 3 as the lower mounting plate. Still further, the neck bracket assembly 30 includes a first bracket 36 positioned between, and coupled or otherwise secured to, each of the base 32 and second bracket 34.

The base 32 includes a base portion 40 having an upper surface 42 and a lower surface 44, with the upper surface 42 or lower surface 44 of the base portion 40, or the base portion 40, defining a base plane BP extending along its width and length. The spinal axis SA also passes through the mount 35, and in particular the first and second brackets 36, 34. A plurality of openings 46 provided on the outer periphery of the base portion 40 are configured to each receive a fastening member 50, such as a bolt or screw, that is used to secure the base portion 40 to the uppermost portion 17 of the spine assembly 18. A central opening 55 (see FIG. 9) also extends between the upper surface 42 and lower surface 44 of the base portion 40.

The neck bracket assembly 30 also includes a pair of spaced apart flange members 52, 54 positioned on and extending from the upper surface 42 of the base portion 40. In certain embodiments, the pair of spaced apart flange members 52, 54 are secured to the upper surface 42 of the base portion 40, while in other embodiments the pair of spaced apart flange members 52, 54 are integrally formed with the base portion 40, and thus are alternatively referred to as extensions of the base portion 40 extending from the upper surface 42.

The first spaced apart flange member 52 includes an outer side portion 56 and an inner side portion 58 opposite the outer side portion 56. A central pin opening 60 and a plurality of additional openings 62 defined by the first spaced apart flange member 52 extend through the first spaced apart flange member 52 between the outer side portion 56 and the inner side portion 58. The first spaced apart flange member 52 also has an upper surface 66, a front surface 68, and a rear surface 70 opposite the front surface 68. A first curved surface 72 connects the upper surface 66 to the front surface 68, while a second curved surface 74 connects the upper surface 66 to the rear surface 70. The upper surface 66 also includes an opening 76 extending in a direction towards the base portion 40.

The second spaced apart flange member 54 includes an outer side portion 79 and an inner side portion 80 opposite the outer side portion 79. A central pin opening 82 defined by the second flange member 54 extends through the second spaced apart flange member 54 between the outer side portion 79 and the inner side portion 80. The second spaced apart flange member 54 also has an upper surface 84, a front surface 85 and a rear surface 86 opposite the front surface 85. A first curved surface 88 connects the upper surface 84 to the front surface 85, while a second curved surface 90 connects the upper surface 84 to the rear surface 86. The upper surface 84 also includes an opening 92 extending in a direction towards the base portion 40.

Figure 7:
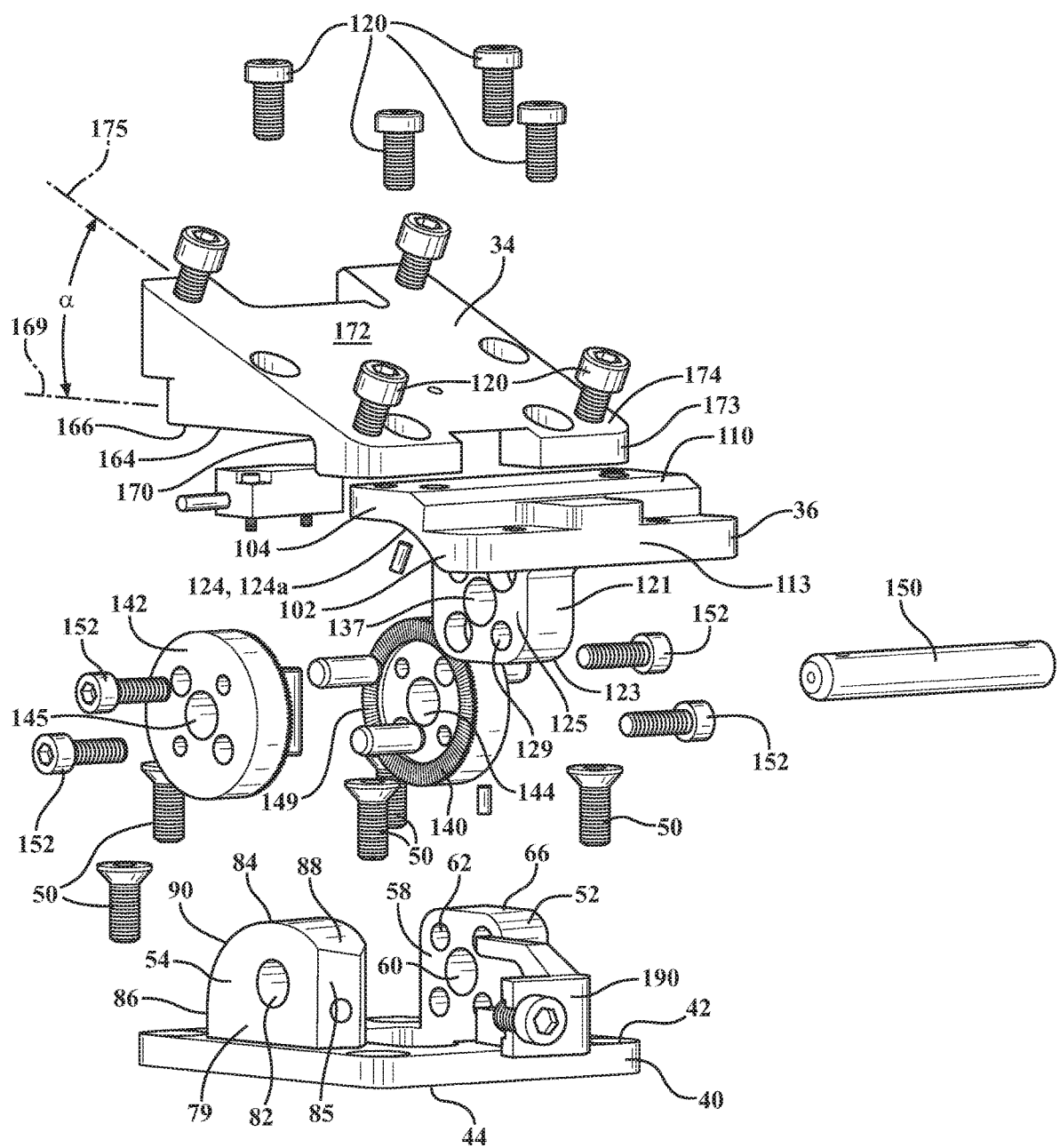
FIG. 7 is a partially exploded perspective view of FIG. 3.
Figure 8:
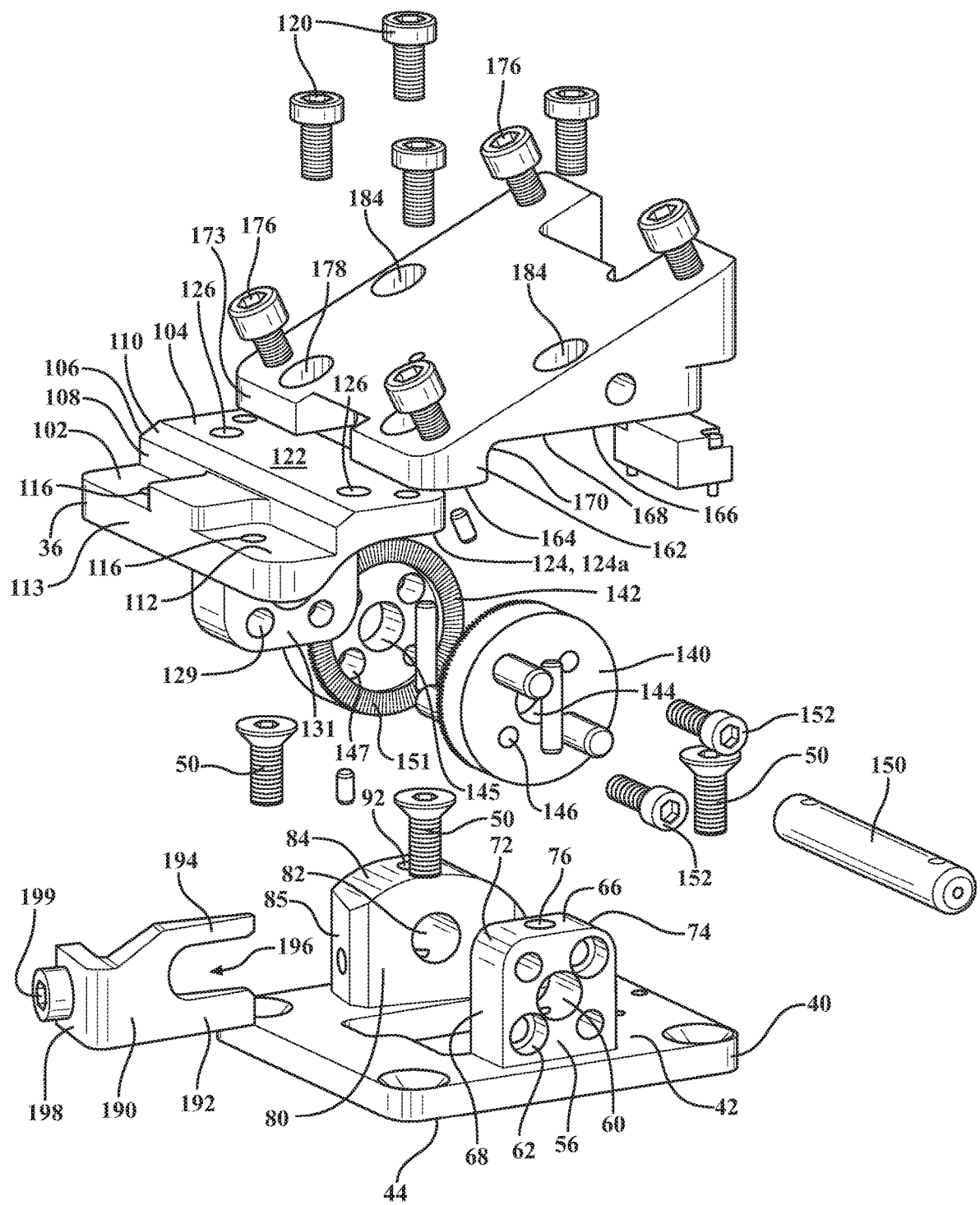
FIG. 8 is a rotated view of FIG. 7.
Figure 9:
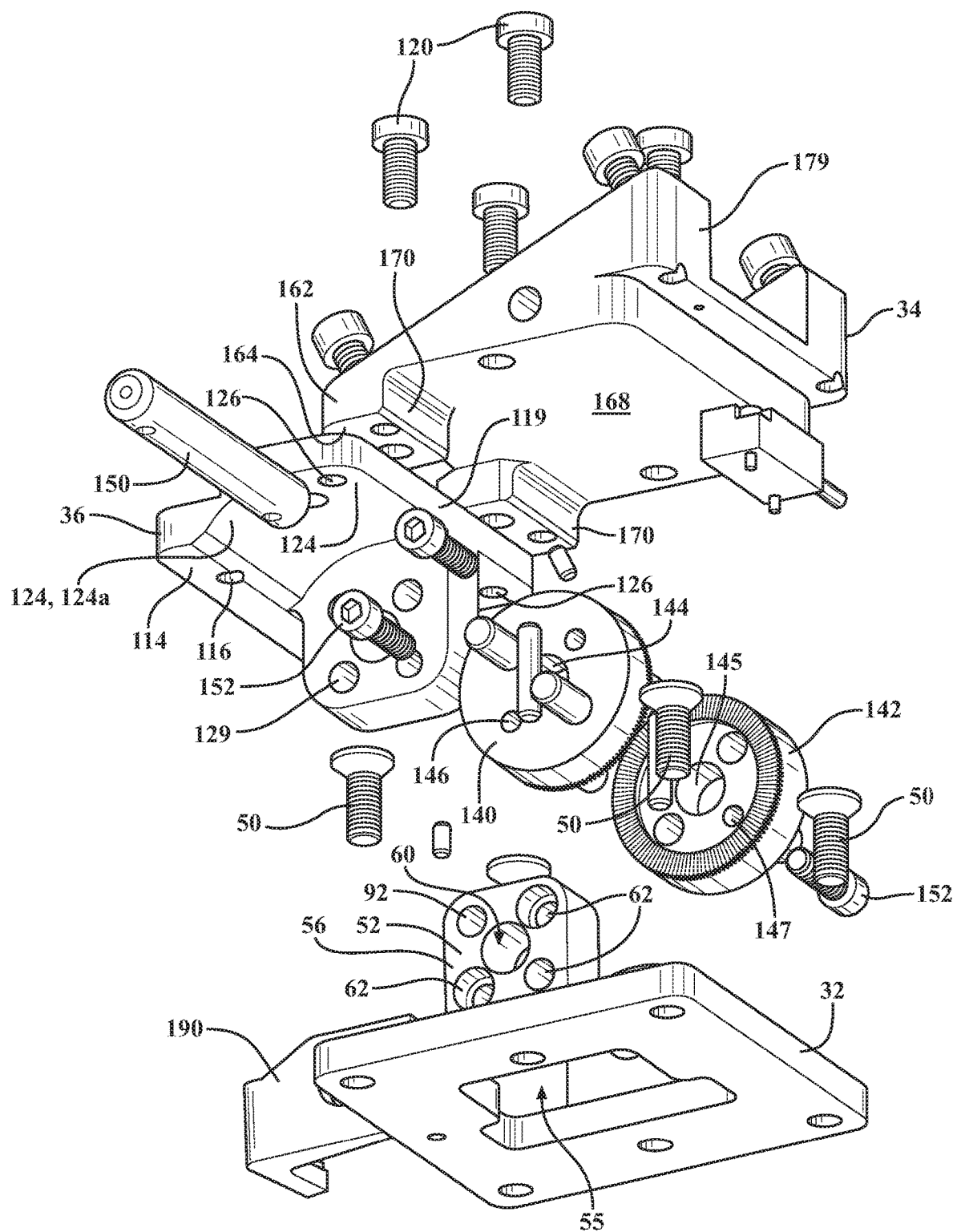
FIG. 9 is another rotated view of FIG. 6.

As best shown in FIGS. 7 and 8, the first bracket 36 includes a lower stepped portion 102 and an upper stepped portion 104 that are connected via a transitional portion 106. The transitional portion 106 includes a vertically extending surface 108 extending from the lower stepped portion 102 and an angled surface 110 extending between the vertically extending surface 108 and upper stepped portion 104.

The lower stepped portion 102 includes an upper surface 112 and an opposing lower surface 114 and defines a proximal edge 113 connecting the upper and lower surfaces 112, 114. A plurality of pairs of spaced apart first openings 116 defined by the lower stepped portion 102 extend from the upper surface 112 towards the lower surface 114, with the first openings 116 configured to receive a corresponding fastening member 120 used to secure the first bracket 36 to the second bracket 34. Additional pairs of openings 116 defined by the lower stepped portion 102 are also contemplated.

The upper stepped portion 104 also includes an upper surface 122 and an opposing lower surface 124 and defines a distal edge 119 connecting the upper and lower surfaces 112, 114. The upper surface 122 generally defines an upper stepped portion plane extending along its length and width. The lower surface 124 is curved so as to define a curved region 124a to be positioned adjacent to the curvature of the first curved surface 72 of the first spaced apart flange member 52 and the first curved surface 88 of the second spaced apart flange member 54 when the first bracket 36 is secured or otherwise rotatably or pivotally coupled to the base 32. The proximal and distal edges 113, 119 of the first bracket 36 also correspond to the proximal and distal ends, respectively of the first bracket 36.

A plurality of pairs of spaced apart second openings 126 defined by the upper stepped portion 104 extend from the upper surface 122 towards the lower surface 124, with the spaced apart second openings 126 configured to receive a corresponding fastening member 120 used to secure the first bracket 36 to the second bracket 34. Additional pairs of openings 126 defined by the upper stepped portion 104 are also contemplated.

A transverse extending member 121 extends from the lower surface 114 and terminates into a rounded end portion 123. The transverse extending member 121 includes a first side surface 125 and an opposing second side surface 131, with the opposing second side surface 131 configured to be aligned between the first and second flange members 52, 54 and in particular in a position nearer to and generally adjacent to the inner side portion 80 of the second flange member 54 when the first bracket 36 is secured to the base 32. The rounded end portion 123 is seated against the upper surface 42 of the base portion 40 when the base 32 is secured to the first bracket 36. A central pin opening 127 defined by the transverse extending member 121 may also be positioned within the transverse extending member 121 and extends between the first side surface 125 and the second side surface 131. A plurality of outer openings 129 defined by the transverse extending member 121 may also be positioned within the transverse extending member 121 remote from the central pin opening 127 and extend between the first side surface 125 and the second side surface 131, with the additional openings 129 configured for alignment with the corresponding additional openings 62 in the first flange member 52 described above A pair of disk spacer members 140, 142 are disposed between the transverse extending member 121 and the first spaced apart flange member 52. Each of the disk spacer members 140, 142 define a central pin opening 144, 145 and a plurality of outer openings 146, 147 remote from the central pin opening 144 extending between the flat side surfaces, with the openings 146, 147 aligned with the additional openings 62 of the first flange member 52 and the additional openings 129 of the transverse extending member 121 when the first bracket 36 is secured to the base 32, as will be described further below. The adjacent inner surfaces each of the disk spacer members 140, 142 include teeth 149, 151 that intermesh when the disk spacer members 140, 142 are coupled together in the neck bracket assembly 30.

For illustrative purposes, the number, size, and relative positioning of the openings 62, 129, 146 and 147 of the respective first flange member 52, transverse extending member 121, and disk spacer members 140, 142 are each shown as each having four openings which are equally spaced and equidistant from their respective central pin openings 60, 127, 144, 145. However, the number, size, and relative positioning of any one or more of the respective first flange member 52, transverse extending member 121, and disk spacer member 140, 142 is not limited to the illustrated configuration, and may vary in one or more variable (number, size and relative positioning). For example, the number of openings 62, 129, 146 and 147 in each of the respective first flange member 52, transverse extending member 121, and disk spacer members 140, 142 may be three openings, or five openings. Still further, the number of openings 129, 146 and 147 may be greater than the number of openings 62 in the first flange member 52 to allow for the securing of the first bracket 36 relative to the base 32 in the parallel position, the frontward non-parallel position, or the rearward non-parallel position, as will be described in further detail below.

The neck bracket assembly 30, in certain embodiments, also includes a forked member 190 that is partially disposed between the second side surface 131 of the transverse extending member 121 and the inner side portion 80 of the second flange member 54 when the first bracket 36 is secured to the base 32. In particular, the fork member 190 can include one or more tines (shown in FIG. 8 as a pair of tines 192, 194) extending from a transverse front flange portion 198 that extend between the second side surface 131 of the transverse extending member 121 and the inner side portion 80 of the second flange member 54 when the first bracket 36 is secured to the base 32. The pair of tines 192, 194 define an opening 196 which is aligned with the central pin opening 127 when the first bracket 36 is secured to the base 32. The front flange portion 198 of the forked member 190 is positioned adjacent to the front surface 85 of the second flange member 54 when the first bracket 36 is secured to the base 32, and may be secured to the second flange member 54 using a fastening member, shown in the Figures as a screw 199, which is introduced through the flange member and into the front surface 85.

To secure together the base 32 and first bracket 36, or otherwise rotatably couple the mount 35 to the base 32, the lower surface 124 of the upper stepped portion 104 of the first bracket 36 is positioned onto the first curved surfaces 72, 88 of the first and second flange members 52, 54 such that the rounded end portion 123 of the transverse extending member 121 is seated onto the upper surface 42 of the base portion 40. In this position, the disk spacer members 140, 142 are partially disposed within the central opening 55 of the base portion 40 and positioned between the transverse extending member 121 and the first flange member 52. In addition, the fork member 190, when present, is introduced between the transverse extending member 121 and the second flange member 54 and is secured to the front surface 85 of the second flange member 54.

During the coupling process, the central pin openings 60, 82 of each of the first and second flange members 52, 54, the central pin opening 127 of the transverse extending member 121, and the central pin openings 144, 145 of the disk spacer member 140, 142 are aligned, along with the opening 196 between the tines 192, 194 of the fork member 190 and additional openings 62, 129, 146, 147 of each of the first flange member 52, the transverse extending member 121, and the disk spacer members 140, 142 remote from the respective central pin openings. A pin 150 is then inserted within the aligned central pin openings 60, 82, 127, 144, 145 and opening 196. The first bracket 36 may then be pivoted (i.e., rotated) about the length of the inserted pin 150 to a desired position relative to the base 32, with the rounded end portion 123 of the transverse extending member 121 rotating along the upper surface 42 of the base portion 40 and with the curved region 124a of the upper stepped portion 104 remaining positioned against the respective first curved surface 72, 88 of the first and second spaced apart flange member 52, 54. Once the first bracket 36 is pivoted to the desired position relative to the base 32, the fastening members 152 are inserted within any one or more of the respective aligned additional openings 62, 129, 146, 147 of each of the first flange member 52, the transverse extending member 121, and the disk spacer members 140, 142 to fixedly secure the first bracket 36 to the base 32 in the desired position.

As noted above, the neck bracket assembly 30 also includes a second bracket 34, sometimes referred to as an upper bracket 34, that is coupled to the first bracket 36.

The second bracket 34 includes a lower portion 160 having a pair of feet 162 each having a lower flat surface 164, with the lower flat surfaces 164 configured to be positioned onto to the upper surface 112 of the lower stepped portion 102 when the first bracket 36 is secured to the second bracket 34. The lower portion 160 also includes a secondary ledge portion 166 defining a lower surface 168, with a portion of the lower surface 168 configured to be positioned onto the upper surface 122 of the upper stepped portion 104. The lower surface 168 defines a first plane 169. A transitional region 170 connects the lower flat surfaces 164 to the lower surface 168, with the transitional region 170 configured to be aligned with the corresponding transitional portion 106 of the first bracket 36 when the first bracket 36 is secured to the second bracket 34.

The second bracket 34 also includes an upper portion 171 extending from the lower portion 160 in a direction away from the first bracket 36 and towards the head assembly 14 in the completed neck bracket assembly 30 and neck assembly 16. The upper portion 171 has an upper angled surface 172 that is configured to be aligned and secured to the lower mounting plate 244 of the neck assembly 16. The upper angled surface 172 extends between a proximal edge 173 and a distal edge 179, corresponding to a proximal and distal end of the second bracket 34, with the terms "proximal" and "distal" corresponding to the location for use of the same terms in describing the proximal and distal edges 113, 119 of the first bracket 36 described above.

The upper angled surface 172 defines a second plane 175 that is angled with respect to first plane 169, with the angle α being between 10 and 45 degrees. Accordingly, the upper angled surface 172 and the lower surface 168 define a wedge-shaped configuration. The relative amount of the angle α is set, in combination with the pivoting rotation of the first bracket 36 relative to the base 32 to the desired position, to allow the neck bracket assembly 30 to be positioned in one of a plurality of desired head positions relative to a vertical plane VP, to simulate a human-like positioning of the cervical spine and head region of a human seated on a seat assembly 10 at the desired seatback angle between 23 and 60 degrees. Owing to the wedge-shaped configuration of the second bracket 34, at least one of the upper angled surface 172 and the lower surface 168 (or at least one of the second and first planes 175, 169) is always angled relative to the base plane BP of the base 32, and depending upon the pivoting of the mount 35 relative the base 32 both of the upper angled surface 172 and the lower surface 168 (i.e., both of the second and first planes 175, 169) may be angled relative to the base plane BP of the base 32.

A plurality of head assembly openings 174 extend normal to and within the upper angled surface 172 and are configured to receive a corresponding fastening member 176 used to secure the head assembly 14 to the second bracket 34. In addition, a plurality of first openings 178 extend between the upper angled surface 172 and the lower flat surface 164 of a respective one of the feet 162, with each one of the first openings 178 aligned with a respective one of the first pair of the openings 116 of the lower stepped portion 102 and configured to receive a fastening member 120 to secure the first bracket 36 to the second bracket 34. Still further, a plurality of second openings 184 extend between the upper angled surface 172 and the lower surface 168 of the secondary ledge portion 166, with a first pair of the second openings 184 aligned with a respective one of the first pair of the openings 126 of the upper stepped portion 104 and configured to receive a fastening member 120 to secure the first bracket 36 to the second bracket 34.

As also noted above, the pivoted positioning of the first bracket 36, relative to the base 32, may be modified by removing fastening members 152 and pivoting the first bracket 36 relative to the base 32 about the rotational axis defined by the length of the pin 150 and then reinserting the fastening members 152 in to secure the first bracket 36 to the base 32 in this pivoted new position. The pivoting of the first bracket 36, in turn, pivots the coupled second bracket 34 relative to the base 32 (i.e., the mount 35 pivots relative to the base 32) as well, and hence the mount 35 also pivots the coupled head assembly 14 relative to the coupled spine assembly 18 and relative to the vertical plane VP, thereby allow angular adjustments of the head assembly 14 relative to the spine assembly 18 and vertical plane VP.

Figure 10A:
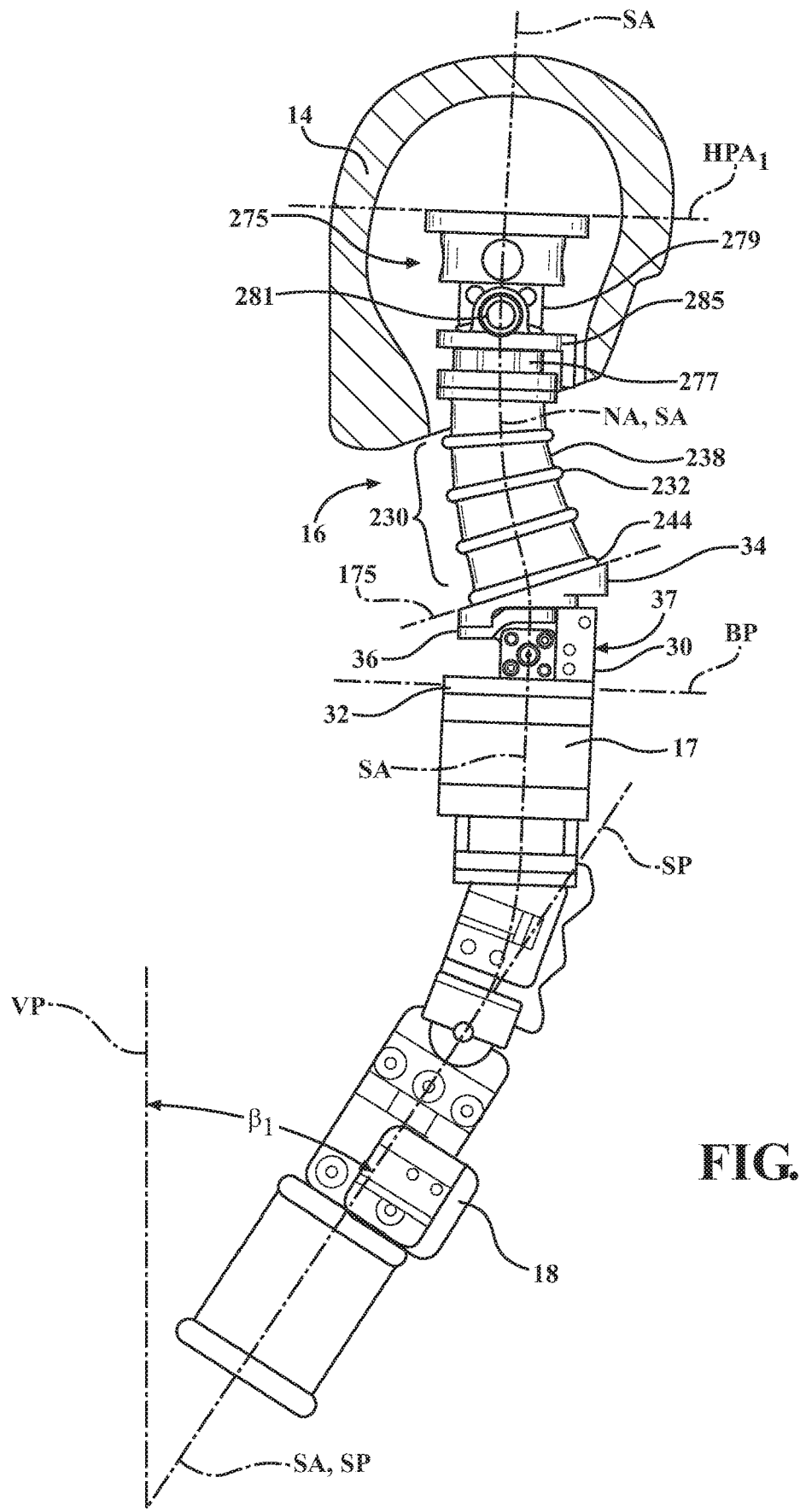
FIG. 10A is a side perspective view of a portion of the anthropomorphic test device of FIG. 1A with the spinal plane set at the 23-degree seatback position relative to the vertical plane and with the upper planar surface of the mount set at an initial angle relative to a base plane and with the head and neck assembly in a desired one of the plurality of head positions relative to the vertical plane.
Figure 10B:
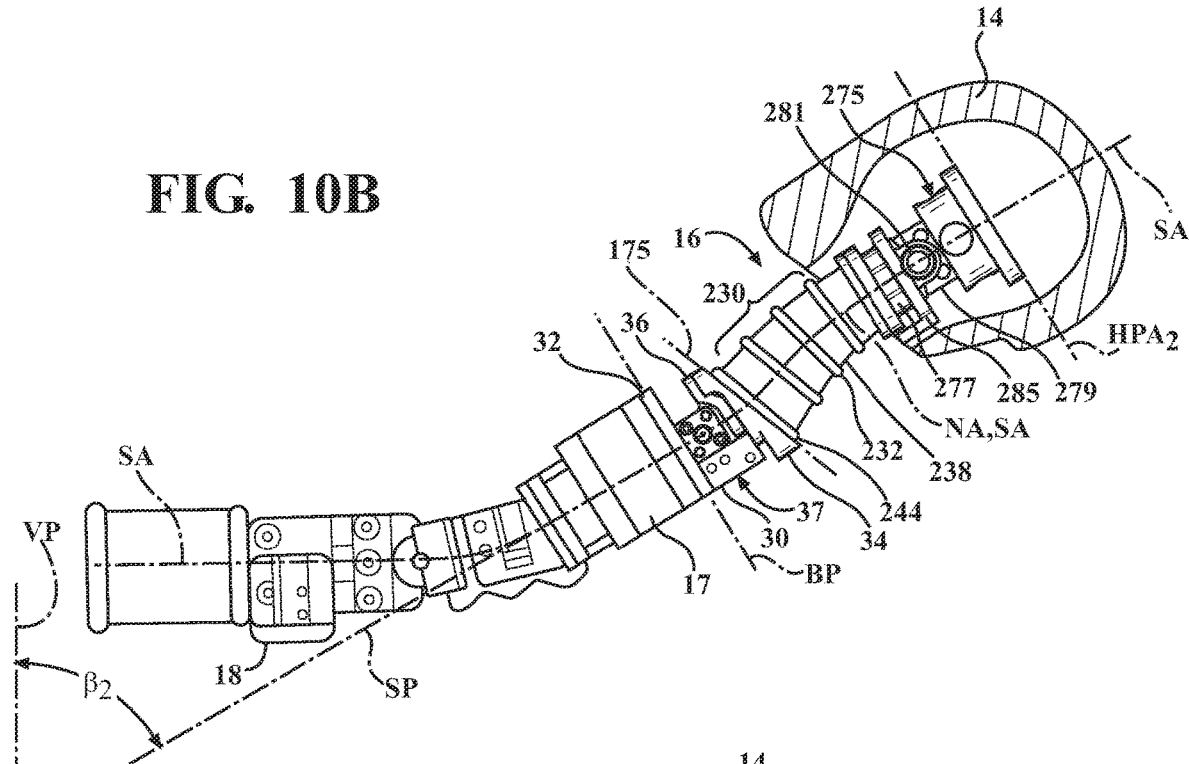
FIG. 10B is a side perspective view of a portion of the anthropomorphic test device of FIG. 10A and FIG. 1B with the spinal plane repositioned at the 60-degree seatback position relative to the vertical plane and with the upper planar surface of the mount set at an initial angle relative to a base plane.
Figure 10C:
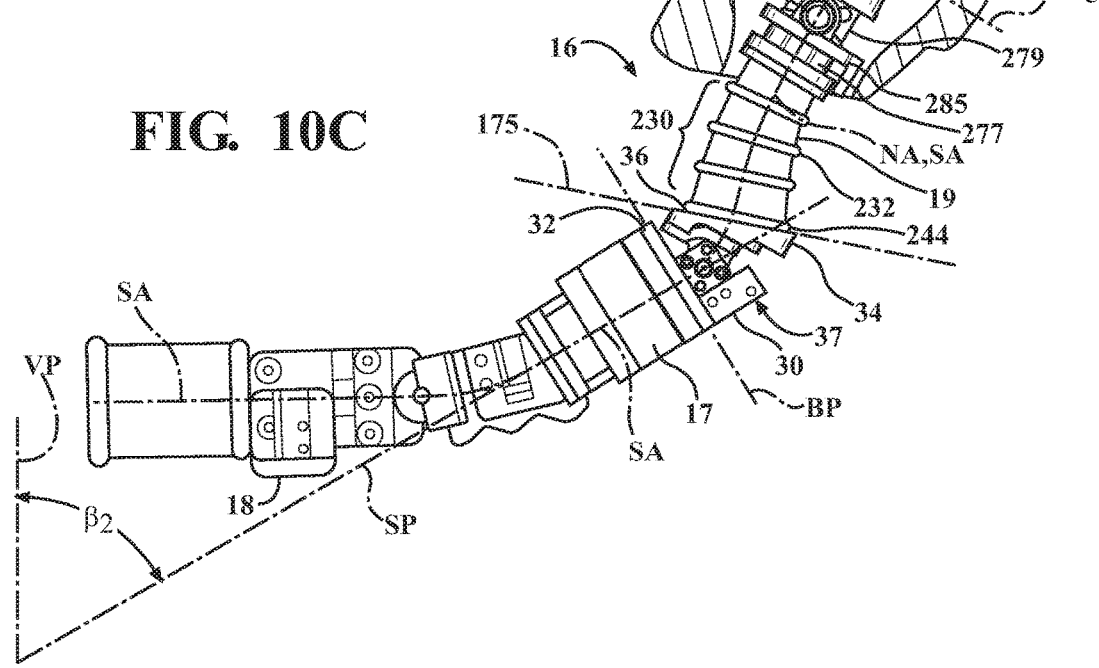
FIG. 10C is a side perspective view of a portion of the anthropomorphic test device of FIGS. 10A and 10B with the spinal plane remaining at the 60-degree seatback position relative to the vertical plane and with mount rotated relative to the base such that the upper planar surface of the mount is at a repositioned angle with respect to the base plane and with the head and neck assembly maintained in the desired one of the head and neck positions.

To illustrate the method of using the neck bracket assembly 30 of the present disclosure to adjust the positioning of the head and neck assembly 14, 16 to maintain a the head position of the head assembly 14 in a desired one of the head positions relative to the spinal plane SP and vertical plane VP as the crash test dummy 12 is positioned and repositioned with varying spinal angles relative to the vertical plane VP, FIGS. 10A-10C are provided.

Referring first to FIG. 10A, the anthropomorphic test device 12 has first been positioned with the neck bracket assembly 30 of FIGS. 3-9 with the spinal plane SP set at a first seatback position β1 relative to the vertical plane VP. As illustrated, the neck bracket assembly 30 has been positioned wherein the base plane BP is generally horizontal and thus normal to the vertical plane VP. The second plane 175 is thus angled relative to the vertical plane VP, with the curved neck axis NA extending upward the first bracket 34 and into the head assembly 14. The accordingly, the curvature of the neck axis NA, which curves opposite the curvature of the spinal assembly SA, is such that it is generally vertical, and thus extends along a vertical plane parallel to and spaced from the vertical plane VP. This vertical positioning allows a head positioning axis HPA1, which extends normal to the neck axis NA to extend generally horizontally. A generally horizontal head positioning axis, as illustrated in FIG. 10A by HPA1, represents one of a plurality of desired head and neck positions, which generally corresponds to the eye positioning and angle of view of the head assembly 14 of a crash test dummy 12 (as shown in FIG. 10A, the eyes of the dummy 12 not shown would look leftward from the head assembly 14 along head positioning axis HPA1). Other desired head and neck positions may vary from horizontal by a small number or radians, such as +/−15 radians relative to a horizontal plane normal to the vertical plane VP, depending upon whether the crash test dummy 12 is position in the first seatback position β1 or the second seatback position β2.

Next, in FIG. 10B, the anthropomorphic test device 12 has been repositioned to the second seatback position β2 by rotating the entire dummy 12 in a clockwise rotational direction 37 degrees (corresponding to the difference of the spinal plane SP relative to the vertical plane VP in the second seatback position β2. As FIG. 10B illustrates, the rotation in the clockwise direction such that the spinal angle β2 is 60 degrees causes the head positioning axis HPA to rotate 37 degrees as well. Still further, the base plane BP rotates as well from a substantially horizontal configuration to an angled configuration. Even still further, the second plane 175 rotates initially towards a more horizontal configuration, depending upon the angle α between the upper angled surface 172 and the lower surface 168. Assuming as in FIG. 10A that the eyes of the dummy 12 view along HPA2 leftward as in FIG. 2, this would result in the eyes looking upward above the horizontal plane.

To compensate for the new head positioning axis HPA2 resulting in the head and neck position of the anthropomorphic test device 12 being in a non-desired position, as shown in FIG. 10C, the mount 35 of the neck bracket assembly 30 is then pivoted in a opposite rotational direction to the repositioning step to increase the seatback angle done above. This pivoting movement moves the neck angle NA to a more vertical positioning relative to the vertical plane VP and, depending upon the degree of rotation of the mount 35, can move the neck angle NA such that the head and neck assemblies return to one of the desired head and neck positions, as shown by the new head positioning axis HPA3.

As FIGS. 10A-10C illustrate, minor angular modifications of the positioning of the head assembly 14 relative to the spine assembly 18 and vertical plane VP to a more desired head and neck position can quickly and easily be realized to more precisely simulate a human-like response of the anthropomorphic test device 12 seated on a seating assembly 10 in either a driving posture or a reclined posture (i.e., wherein the spine plane SP is aligned at angle β1 or β2 relative to the vertical plane VP) to a collision test. Moreover, such modifications can be done without the need to completely disassemble the neck assembly 16 and/or disassemble the neck assembly 16 from the head assembly 14 or spine assembly 18.

While not illustrated in FIGS. 10A-10C, in addition to rotating the mount 35 relative to the base 32 to alter the neck angle NA (and hence the head positioning axis HPA), a user can also pivot the upper neck/head pivotable bracket assembly 275 about the pin 281, thereby adjusting the head assembly 14 relative to the neck assembly 16 and neck axis NA, to achieve additional modifications to one of the desired head positions.

In alternative related embodiments, as opposed to wherein the second bracket 34 is fixedly secured to the first bracket 36 in a single configuration as described above, an alternative embodiment the second bracket 34 may be fixedly secured to the first bracket 36 in any one of a plurality of configurations in which the transitional region 170 is spaced at varying distances from the corresponding transitional portion 106 of the first bracket 36.

Figure 11:
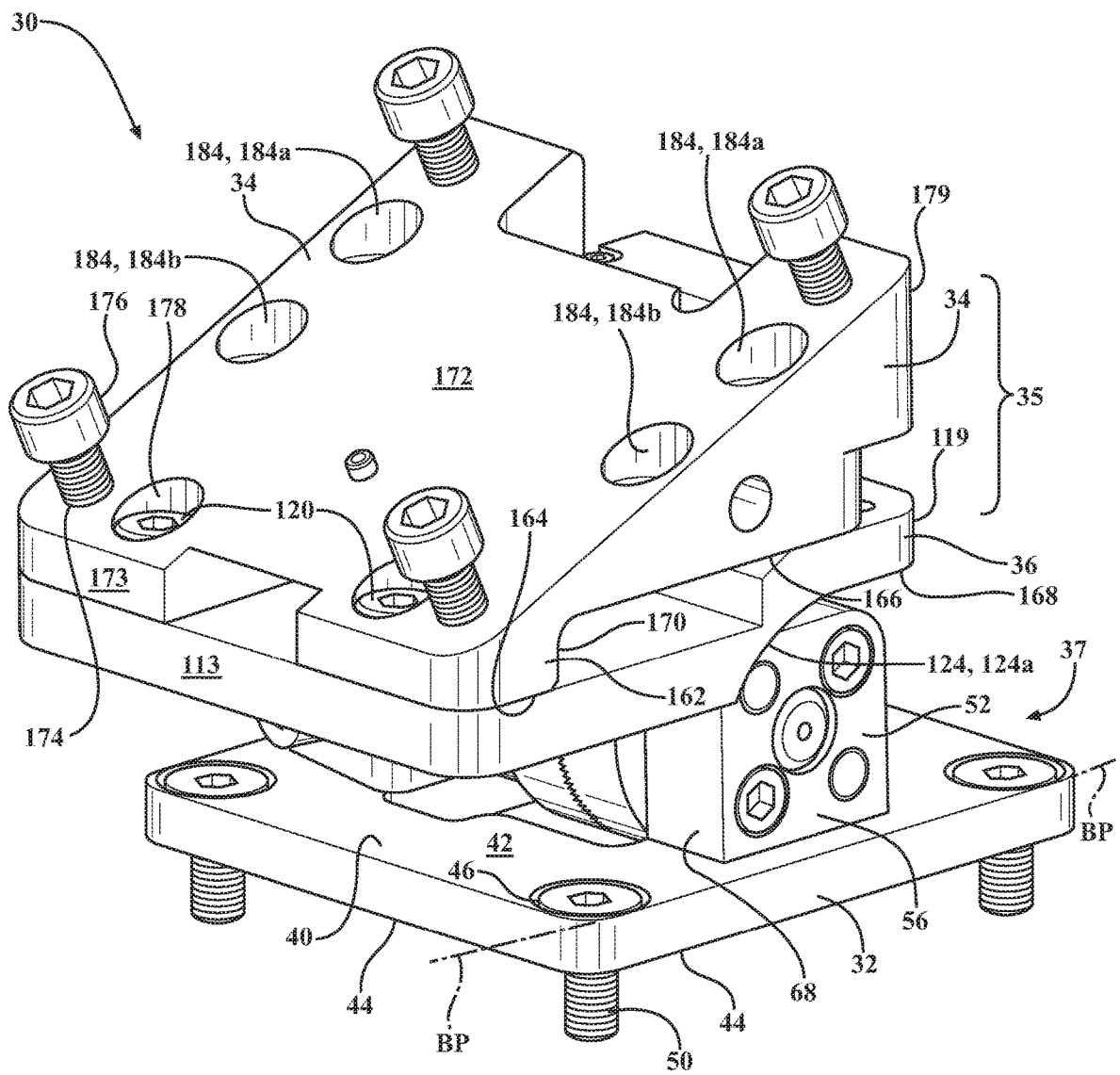
FIG. 11 is a front perspective view of the neck bracket assembly of FIG. 2 in an assembled state in a first position according to another embodiment.
Figure 12:
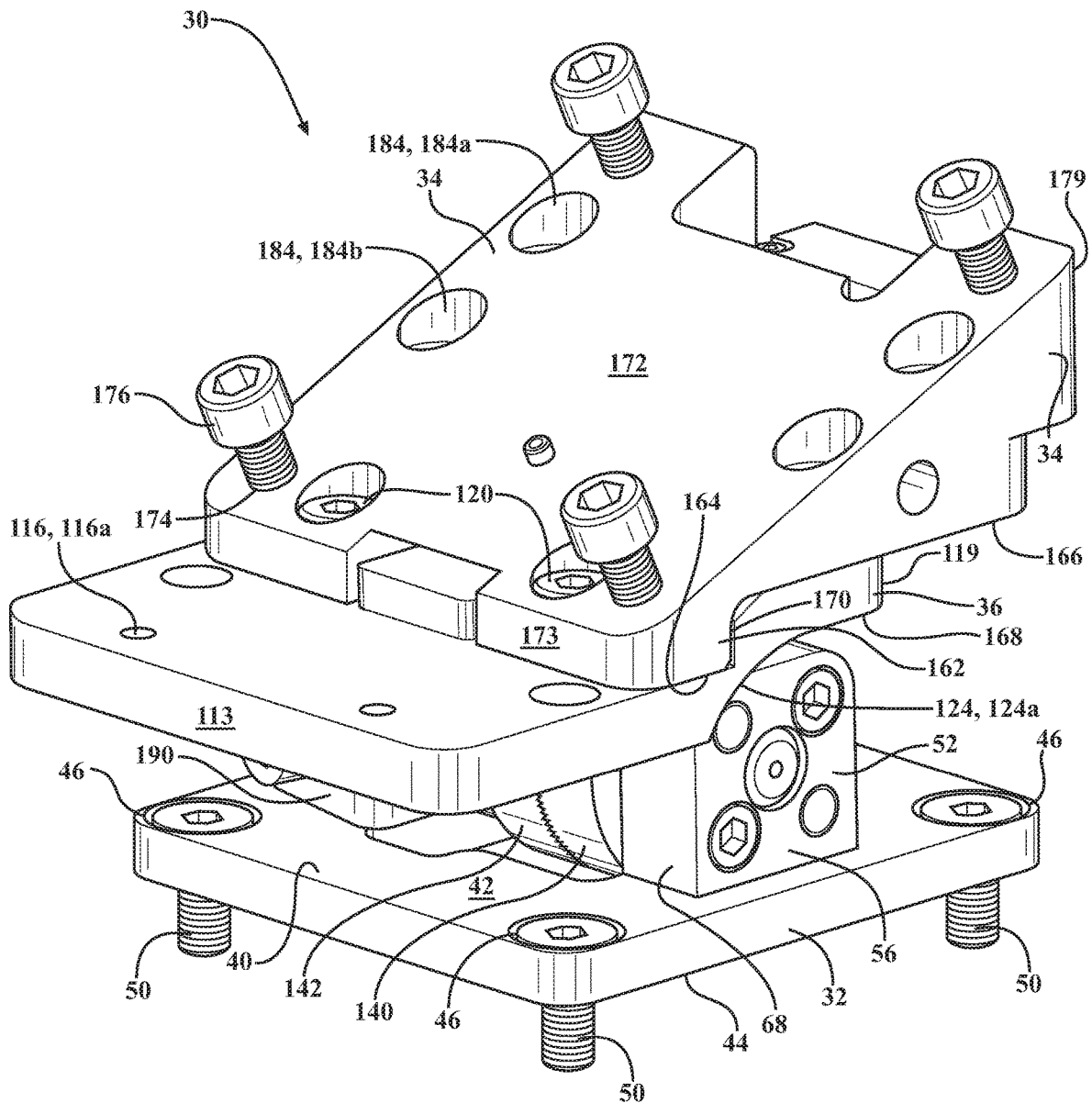
FIG. 12 is a front perspective view of the neck bracket assembly of FIG. 10 in an assembled state in a second position.
Figure 13:
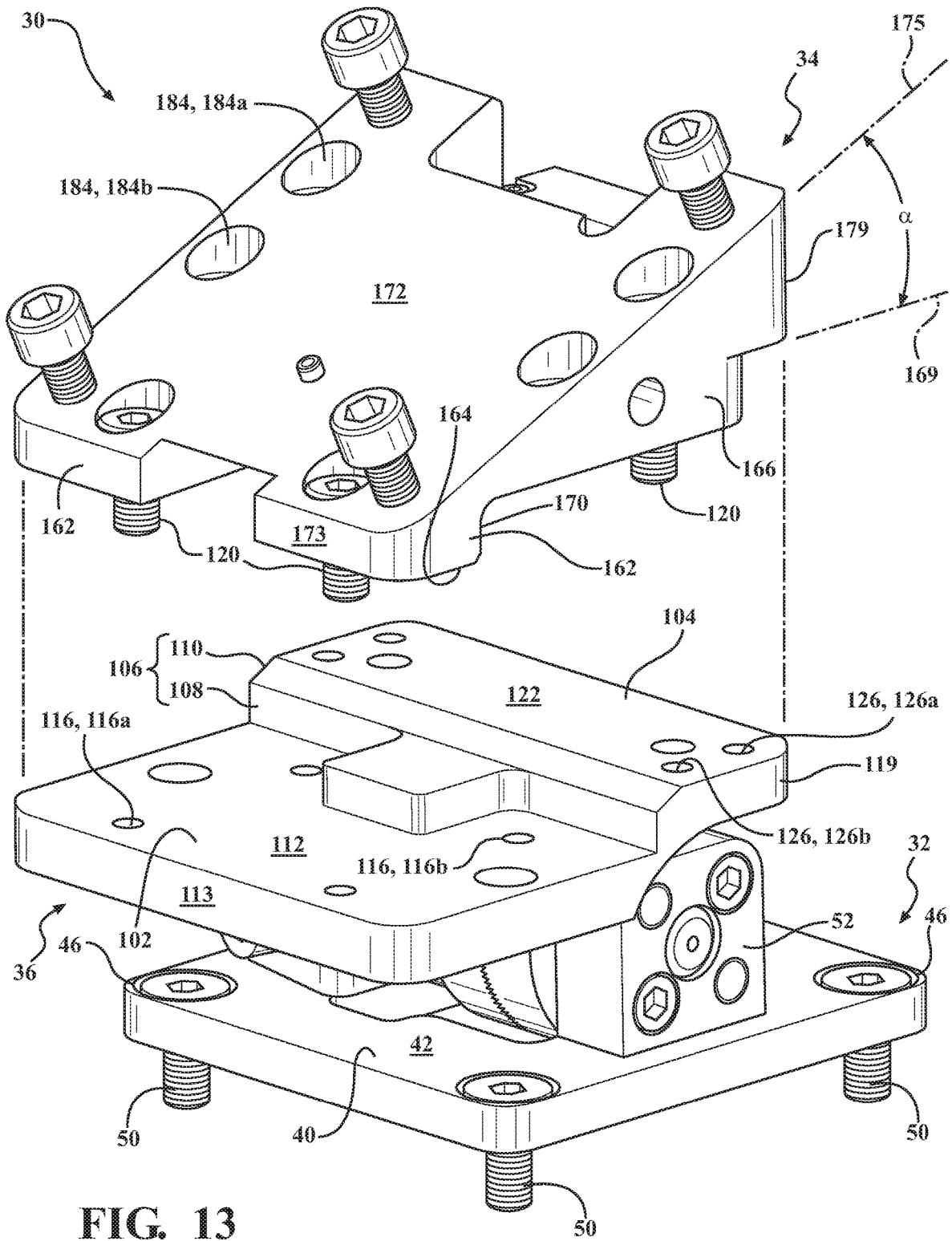
FIG. 13 is a partially exploded perspective view of FIG. 10.
Figure 14:
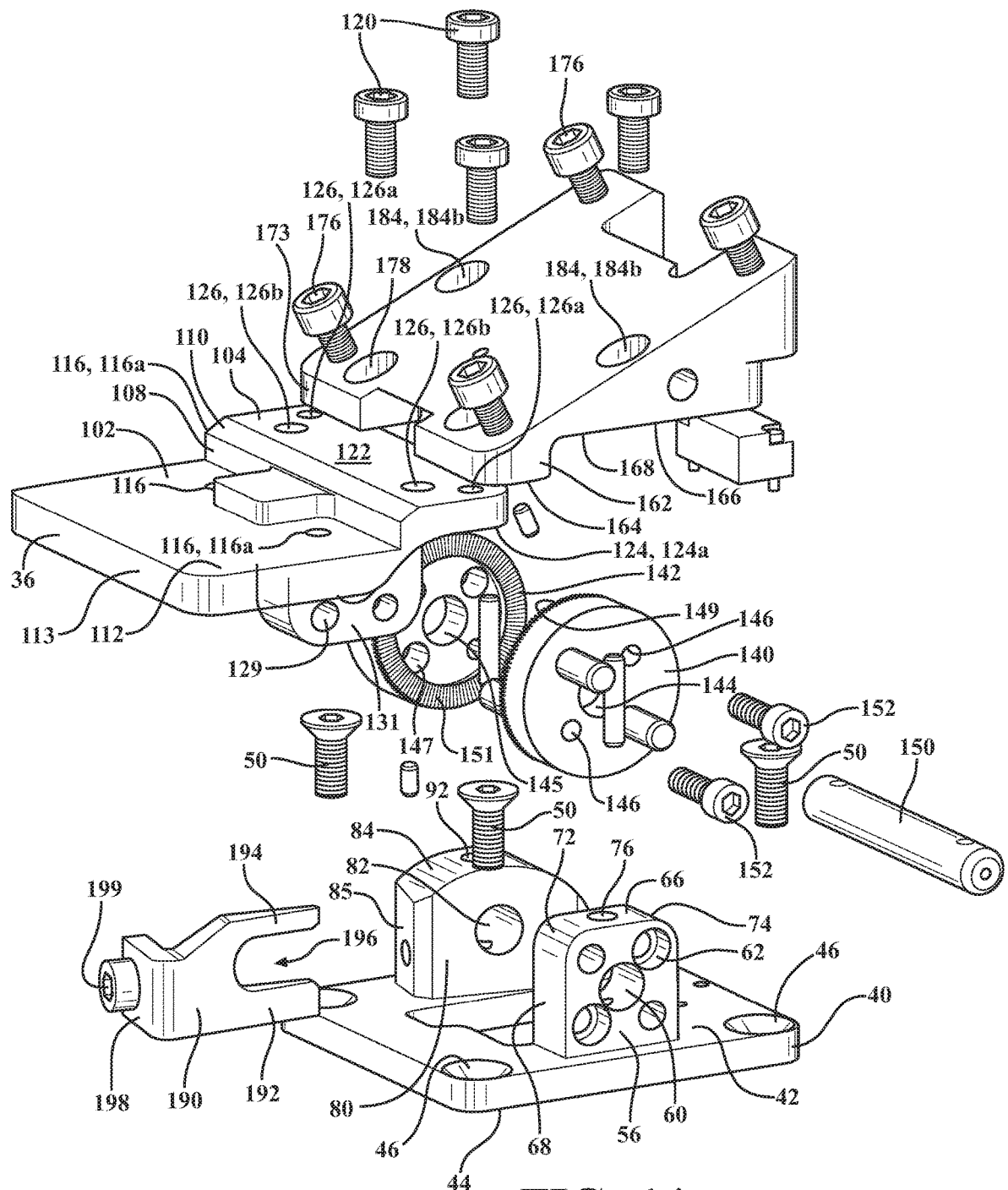
FIG. 14 is a partially exploded perspective view of FIG. 11.
Figure 15:
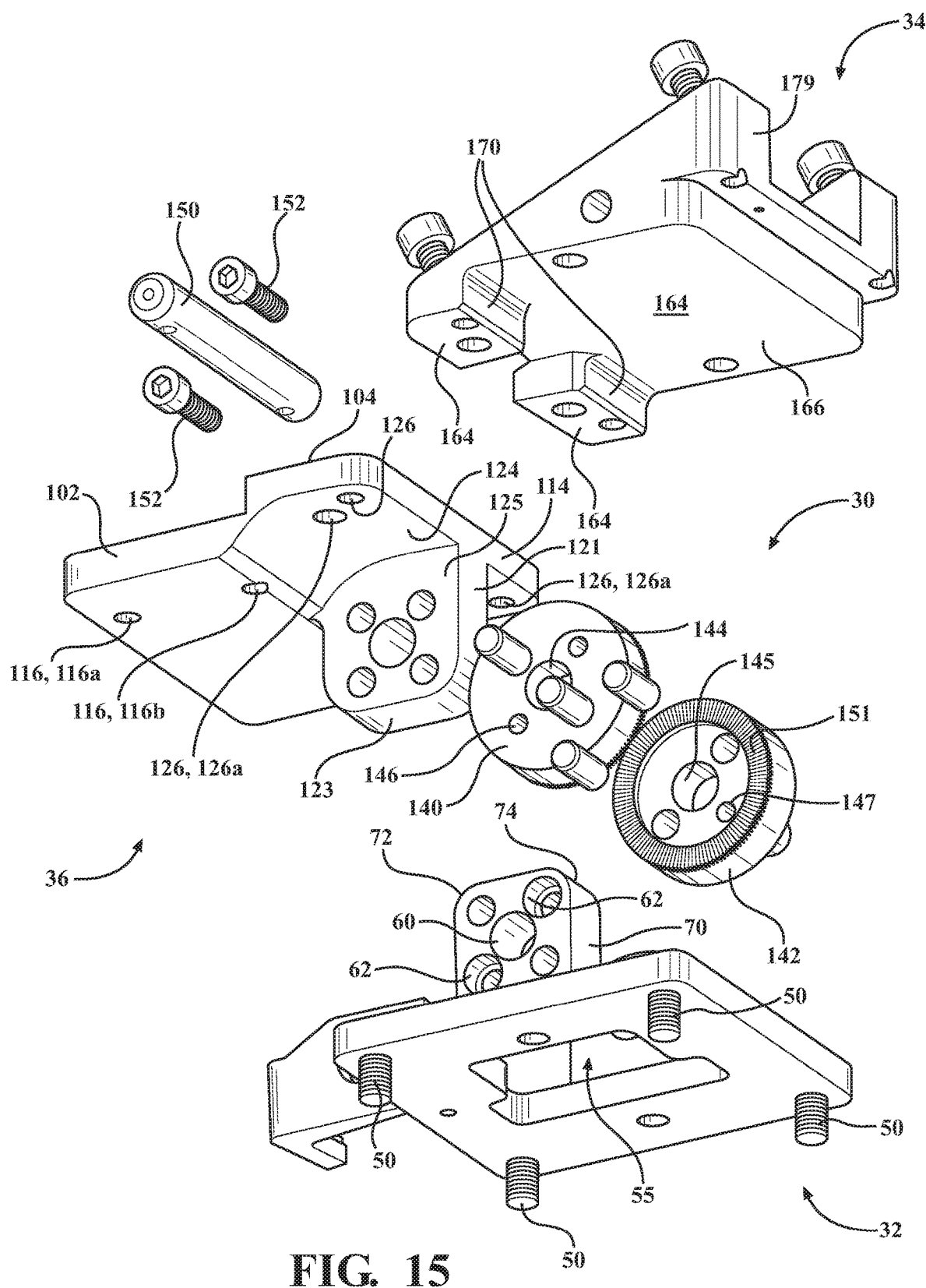
FIG. 15 is a rotated view of FIG. 14.

In one of these alternative embodiments as illustrated in FIGS. 11-16, two alternative configurations are shown, the first of which (see FIGS. 11 and 16A) the second bracket 34 is fixedly secured to the first bracket 36 in which the transitional region 170 is spaced at a maximum distance from the corresponding transitional portion 106 of the first bracket 36 (i.e., a first configuration). In the second configuration, as shown in FIGS. 12 and 16B, the second bracket 34 is fixedly secured to the first bracket 36 in which the transitional region 170 is spaced at a minimum distance from the corresponding transitional portion 106 of the first bracket 36, and thus the transitional region 170 is aligned and adjacent to the corresponding transitional portion 106 of the first bracket 36.

To allow the first bracket 36 to be fixedly secured to the second bracket 34 in these two alternative configurations, and to allow the first bracket 34 to be coupled to the lower mounting plate 244 in either of the two alternative configurations, the first and second brackets 36, 34 each include additional alternative openings for allowing the alternative coupling.

In particular, the lower stepped portion 102 of the first bracket 36 includes a plurality of pairs of spaced apart first openings 116 extend from the upper surface 112 towards the lower surface 114, with one respective pair of the first openings 116a (see FIGS. 12-15) configured to receive a corresponding fastening member 120 used to secure the first bracket 36 to the second bracket 34 when the second bracket is in the first configuration and a second pair of the first openings 116b configured to receive the corresponding fastening member 120 used to secure the first bracket 36 to the second bracket 34 when the second bracket is in the second configuration as will be described further below. Additional pairs of openings (not shown) between the first and second pair of openings 116a and 116b are also contemplated.

In addition, the second bracket 36 includes a plurality of first openings 178 extend between the upper angled surface 172 and the lower flat surface 164 of a respective one of the feet 162, with each one of the first openings 178 aligned with a respective one of the first pair of the openings 116a of the lower stepped portion 102 and configured to receive a fastening member 120 to secure the first bracket 36 to the second bracket 34 in the first configuration, and wherein each one of the first openings 178 is aligned with a respective one of the second pair of the openings 116b of the lower stepped portion 102 and configured to receive a fastening member 120 to secure the first bracket 36 to the second bracket 34 in the second configuration.

Still further, a plurality of second openings 184 extend between the upper angled surface 172 and the lower surface 168 of the secondary ledge portion 166, with a first pair of the second openings 184a (see FIG. 11) aligned with a respective one of the first pair of the openings 126a of the upper stepped portion 104 and configured to receive a fastening member 120 to secure the first bracket 36 to the second bracket 34 in the first configuration. A second pair of the second openings 184b are aligned with a respective one of the second pair of the openings 126b of the upper stepped portion 104 and configured to receive the fastening member 120 to secure the first bracket 36 to the second bracket 34 in the second configuration.

Figure 16A:
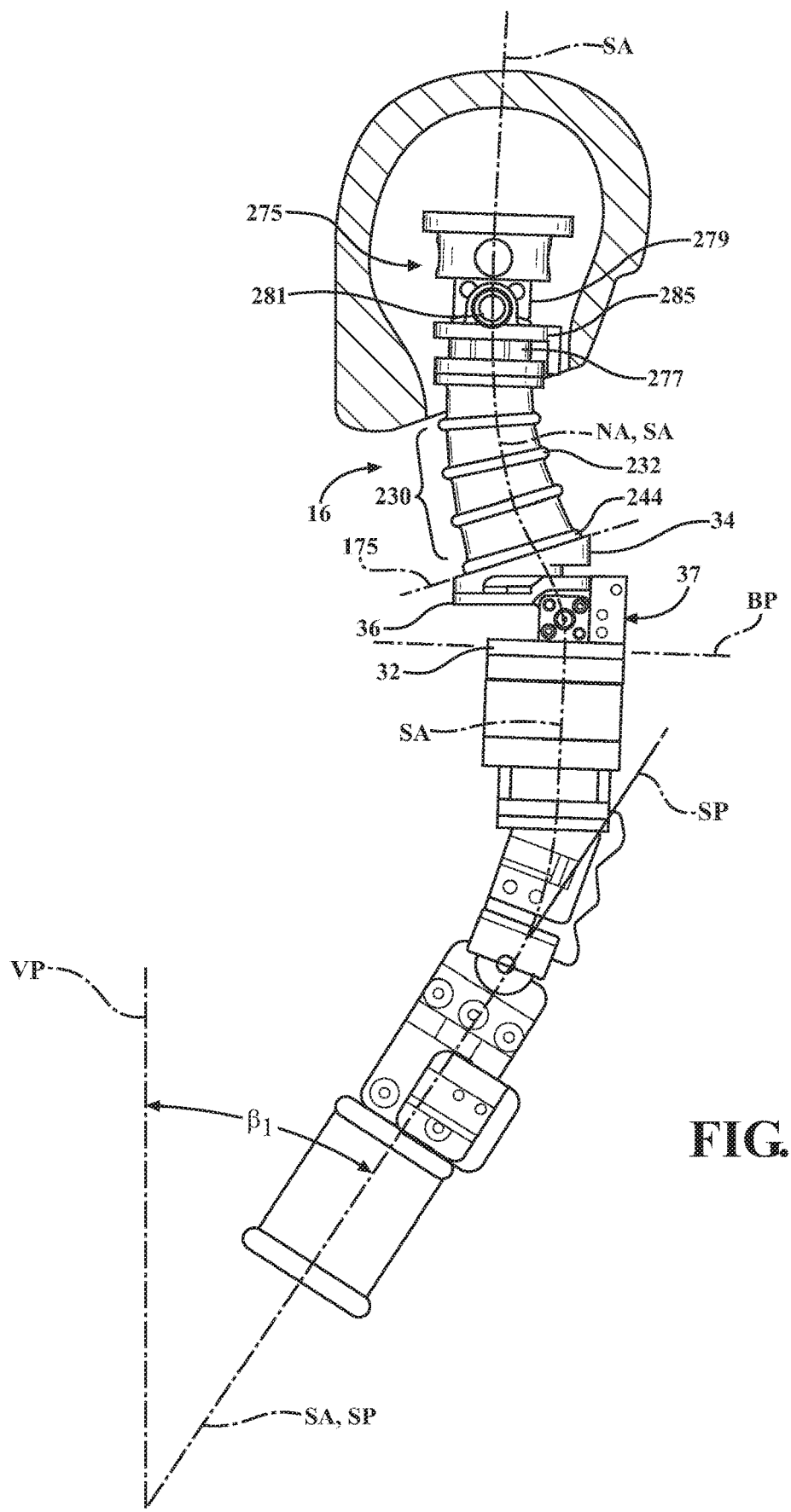
FIG. 16A is a side perspective view of a portion of the anthropomorphic test device with the neck bracket assembly of FIGS. 11-13 with the spinal plane set at a first seatback position relative to the vertical plane with the head and neck assembly and with the second bracket fixed to the first bracket in a forward shifted configuration.

To secure the first bracket 36 to the second bracket 34 in the first configuration, as best shown in FIGS. 11 and 16A, the second bracket 34 is positioned onto the first bracket 36 with the transitional region 170 of the second bracket 34 spaced apart from the transitional portion 106 of the first bracket 36 and with the first pair of the second openings 184a aligned with a respective one of the first pair of the openings 126a of the upper stepped portion 104. The fastening members 120 are introduced through the aligned openings 184a, 126a to secure the upper stepped portion 104 of the first bracket 36 to the second bracket 34 and wherein additional fastening members 120 are introduced through the aligned openings 178 and 116a to secure the lower stepped portion 102 of the first bracket 36 to the second bracket 34. The first bracket 36 may then be secured to lower mounting plate 244 using the fastening members 176.

Figure 16B:
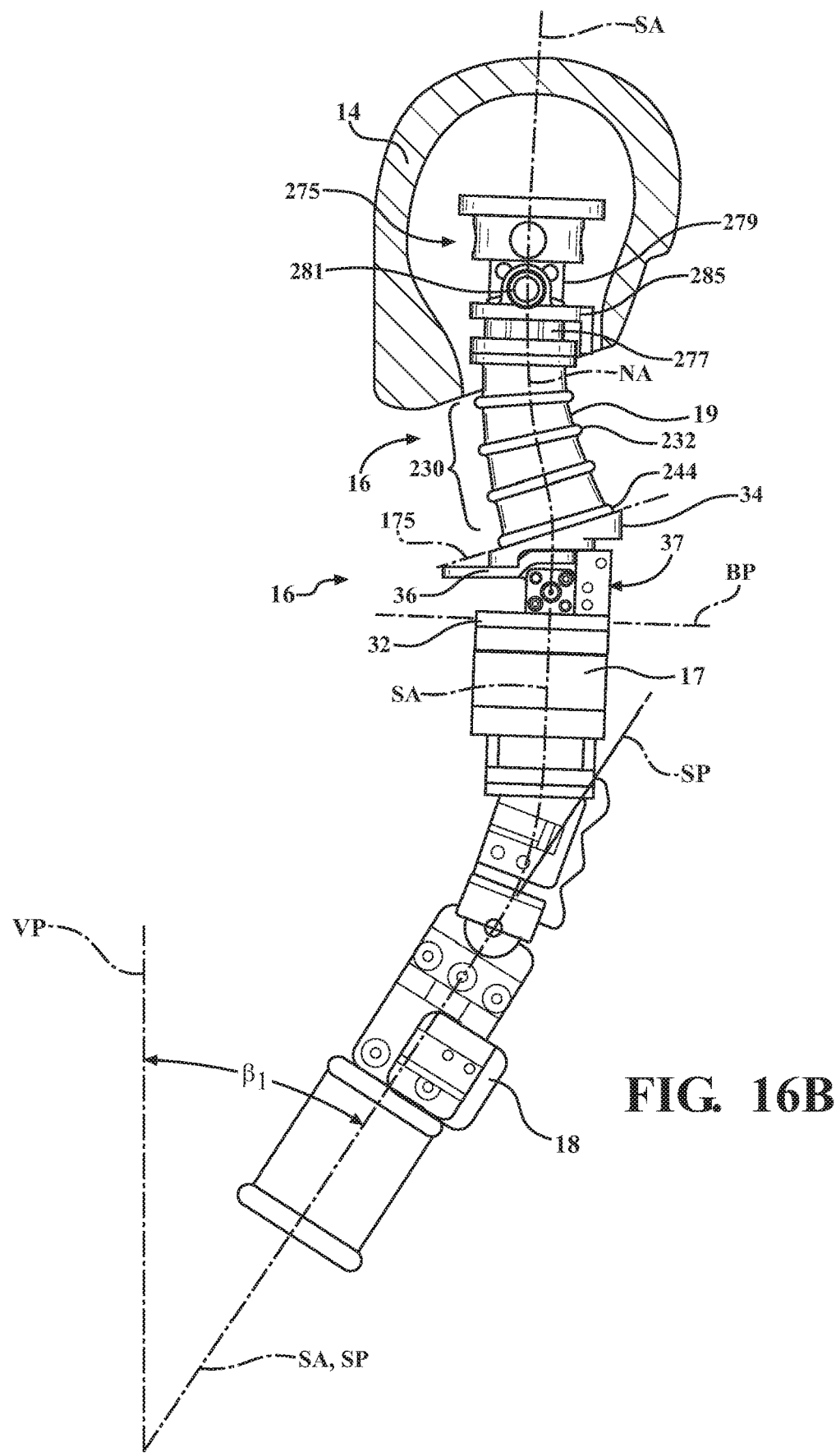
FIG. 16B is a side perspective view of a portion of the anthropomorphic test device with the neck bracket assembly of FIG. 16A with the second bracket fixed to the first bracket in a rearward shifted configuration as compared with the forward shifted configuration of FIG. 16A.

By contrast, to secure the first bracket 36 to the second bracket 34 in the second configuration, as best shown in FIGS. 12 and 16B, the second bracket 34 is shifted rearward relative to the first bracket 36 such that the transitional region 170 of the second bracket 34 is positioned adjacent to the transitional portion 106 of the first bracket 36 and with the second pair of the second openings 184b aligned with a respective one of the second pair of the openings 126b of the upper stepped portion 104. The fastening members 120 are inserted through the aligned openings 126b, 184b to secure the upper portion 104 of the first bracket 36 to the second bracket 34 and wherein additional fastening members 120 are introduced through the aligned openings 178 and 116b to secure the lower stepped portion 102 of the first bracket 36 to the second bracket 34). The first bracket 36 may then be secured to lower mounting plate 244 using the fasteners 176.

In further embodiments not shown, multiple additional configurations for securing the second bracket 34 to the first bracket 36 are contemplated between the first configuration and second configuration described above, wherein the transitional region 170 of the second bracket 34 is positioned closer to the transitional portion 106 of the first bracket 36 than in the first configuration but further from the transitional portion 106 of the first bracket 36 in the second configuration. By way of one example, the first openings 184a on the second bracket 34 may be aligned the openings 126b on the upper stepped portion 104 of the first bracket 34, and the openings 178 are aligned with a third pair of openings 116 on the lower stepped portion 102 distinct from the openings 116a or 116b, and fastening members 120 are inserted with the aligned pairs 184a, 126b and 178, 116 to secure the second bracket 34 to the first bracket 34. In other examples, further pairs of openings 126 between the first and second pairs 126a and 126b coupled be included on the upper stepped portion 104, and the first openings 184a on the second bracket 34 may be aligned with such openings and fastening members 120 are inserted with the aligned pairs 184a, 126 and 178, 116 to secure the second bracket 34 to the first bracket 34.

The shifting of the first bracket 36 of the second bracket 34 between the first and second configuration provides the neck bracket assembly 30 with an additional way, in addition to the pivoting of the mount 35 relative to the base 32 as described above, secure the neck bracket assembly 30 with the head and neck assemblies 14, 16 in one of the desired head positions. In particular, the shifting may allow the neck axis NA to be aligned closer to the plane of the spinal axis SA beneath the neck bracket assembly 30 to provide additional stability to the crash test dummy 12 at any of the spinal angles related to the chosen seatback angle β1 or β2.

The present disclosure also describes a system 1000 for creating a virtual anthropomorphic test device and evaluating the created virtual anthropomorphic test device in a virtual crash test using a software application included on a computer. The anthropomorphic test device is a virtual representation of the anthropomorphic test device described above, including all of the features and components of the neck bracket assembly 30, and the associated additional components of the anthropomorphic test device 20, as described above.

Figure 17:
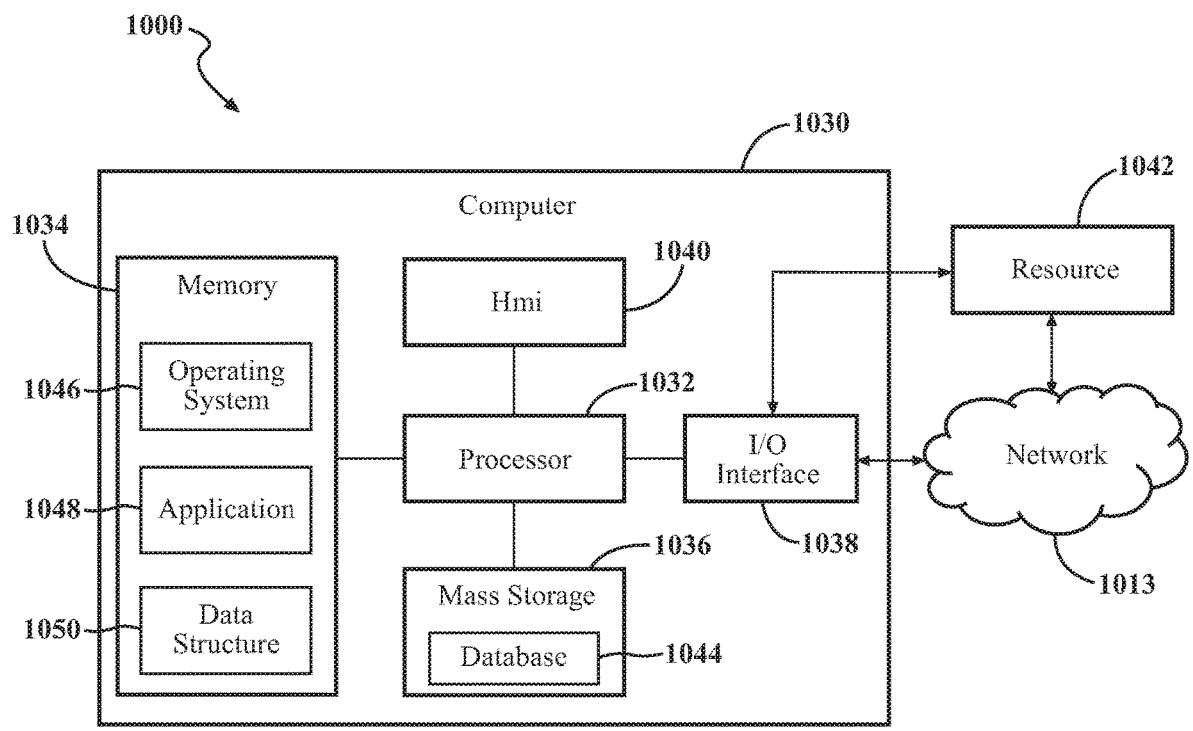
FIG. 17 is a schematic view of a system for creating and evaluating a virtual anthropomorphic test device.

Referring now to FIG. 17, the computer 1030 may include at least one processor 1032, a memory 1034, a mass storage memory device 1036, an input/output (I/O) interface 1038, and a Human Machine Interface (HMI) 1040. The computer 1030 may also be operatively coupled to one or more external resources 1042 via the network 1013 and/or I/O interface 1038. External resources may include, but are not limited to, servers, databases, mass storage devices, peripheral devices, cloud-based network services, or any other suitable computing resource that may be used by the computer 1030.

The processor 1032 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 1036 may include data storage devices such as a hard drive, optical drive, tape drive, non-volatile solid state device, or any other device capable of storing information. A database 1044 may reside on the mass storage memory device 1036 and may be used to collect and organize data used by the various systems and modules described herein.

Processor 1032 may operate under the control of an operating system 1046 that resides in memory 1034. The operating system 1046 may manage computing resources so that computer program code embodied as one or more computer software applications, such as an application 1048 residing in memory 1034, may have instructions executed by the processor 1032. In an alternative embodiment, the processor 1032 may execute the application 1048 directly, in which case the operating system 1046 may be omitted. One or more data structures 1050 may also reside in memory 1034, and may be used by the processor 1032, operating system 1046, and/or application 1048 to store or manipulate data. The software application 1048, as provided herein, includes software applications that create the virtual anthropomorphic test device 10' and software applications that evaluate the created virtual anthropomorphic test device 10' in a virtual crash test setting.

The I/O interface 1038 may provide a machine interface that operatively couples the processor 1032 to other devices and systems, such as the network 1013 and/or external resource 1042. The application 1048 may thereby work cooperatively with the network 1013 and/or external resource 1042 by communicating via the I/O interface 1038 to provide the various features, functions, applications, processes, and/or modules comprising embodiments of the invention. The application 1048 may also have program code that is executed by one or more external resources 1042, or otherwise rely on functions and/or signals provided by other system or network components external to the computer 1030. Indeed, given the nearly endless hardware and software configurations possible, persons having ordinary skill in the art will understand that embodiments of the invention may include applications that are located externally to the computer 1030, distributed among multiple computers or other external resources 1042, or provided by computing resources (hardware and software) that are provided as a service over the network 1013, such as a cloud computing service.

The HMI 1040 may be operatively coupled to the processor 1032 of computer 1030 in a known manner to allow a user of the computer 1030 to interact directly with the computer 1030. The HMI 1040 may include video and/or alphanumeric displays, a touch screen, a speaker, and any other suitable audio and visual indicators capable of providing information to the user. The HMI 1040 may also include input devices and controls such as an alphanumeric keyboard, a pointing device, keypads, pushbuttons, control knobs, microphones, etc., capable of accepting commands or input from the user and transmitting the entered input to the processor 1032.

Together with the joints in the thoracic spine assembly, the neck bracket assembly 30 of the present disclosure provides a function that correctly positions the head and neck assemblies of the anthropomorphic test device in a desired head and neck position so as to be representative of the human occupant for the riding and reclined riding postures.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. An anthropomorphic test device comprising:
    a spine assembly with a length of said spine assembly defining a spinal axis;
    a neck assembly having a lower mounting plate coupled to said spine assembly at one end;
    a head assembly coupled to said neck assembly at another end of said neck assembly; and
    a neck bracket assembly coupling said neck assembly to said spine assembly, said neck bracket assembly comprising:
        a base secured to said spine assembly with said base defining a base plane transverse to said spinal axis,
        a mount secured to said neck assembly and coupled to said base with said spinal axis passing through said mount, and
        a pivot mechanism having a first portion secured to said base and a second portion secured to said mount with said neck and head assemblies pivoting relative to said base and said spine assembly in a plurality of head positions,
        wherein said mount has an upper surface and a lower surface with said upper surface of said mount angled relative to said lower surface of said mount to define a wedge-shaped configuration with one of said upper and lower surfaces of said mount being positioned at an angle relative to said base plane in all of said plurality of head positions, and
        wherein said upper surface of said wedge-shaped mount is mounted directly to said lower mounting plate of said neck assembly, and said upper and lower surfaces of said wedge-shaped mount pivoting with said neck and head assemblies as a unit relative to said base in said plurality of head positions.

2. The anthropomorphic test device of claim 1, wherein said lower surface of said mount defines a first plane and wherein said upper surface of said mount defines a second plane with said first plane angled with respect to said second plane at an angle $\alpha$ ranging between 10 and 45 degrees.

3. The anthropomorphic test device of claim 1, wherein said pivot mechanism includes a lock to secure said neck and head assemblies in one of said plurality of head positions.

4. The anthropomorphic test device of claim 1, wherein said mount comprises:
    a first bracket coupled to said base and secured to said pivot mechanism; and
    a second bracket secured to said first bracket and having an upper surface angled relative to an opposing lower surface, with said upper surface of said second bracket further defining said upper surface of said mount, and with said upper surface and said opposing lower surface of said second bracket further defining said wedge-shaped configuration.

5. The anthropomorphic test device of claim 4, wherein said second bracket is secured to said first bracket in one of at least two securing positions relative to said first bracket,
    wherein said second bracket is positioned closer to a proximal end of the first bracket in a first one of said at least two securing positions than in a second one of said at least two securing positions.

6. The anthropomorphic test device of claim 1, further including a second pivot mechanism disposed between said head and neck assemblies to pivot said head assembly relative to said neck assembly independently of pivoting to said plurality of head positions.

7. The anthropomorphic test device of claim 1, wherein said neck assembly defines a neck axis passing through said mount with both said spinal and neck axes defining a radius of curvature.

8. The anthropomorphic test device of claim 7, wherein said radius of curvatures extend in opposite directions.

9. The anthropomorphic test device of claim 1, wherein said pivot mechanism includes a pair of spaced apart flange members secured on and extending from said base portion opposite said spine assembly and a transverse extending member extending from said mount, with said transverse extending member positioned between said pair of flange members, and with a pin extending through said transverse extending member for rotatably coupling said mount relative to said base.

10. The anthropomorphic test device of claim 9, wherein said pivot mechanism includes a plurality of teeth defining discreet head positions of said neck and head assemblies relative to said base.

11. The anthropomorphic test device of claim 10, wherein said pivot mechanism further comprises:
    a pair of disks coupled between one of said pair of flange members and said transverse extending member with said pair of disks having said plurality of teeth.

12. The anthropomorphic test device of claim 1, wherein said pivot mechanism includes openings which are respectively aligned when said mount is pivoted relative to said base to a desired one of said plurality of head positions relative to said base, and wherein a fastening member is introduced within said aligned openings to define a lock and to fixedly secure said mount to said base in said desired one of said plurality of head positions.

13. The anthropomorphic test device of claim 1 further comprising a second pivot mechanism coupled between said head assembly and said neck assembly, with said second pivot mechanism configured to pivot said head assembly relative to said neck assembly.

14. A method of positioning neck and head assemblies of an anthropomorphic test device, the anthropomorphic test device including the head assembly, the neck assembly, a spine assembly with a length of the spinal assembly defining a spinal axis and with the neck assembly coupled to the spine assembly at one end of the neck assembly and the head assembly coupled to the neck assembly at the other end of the neck assembly, the spine assembly defining a spinal plane and a neck bracket assembly coupling the neck assembly to the spine assembly with the neck bracket assembly including a base secured to the spine assembly with the base defining a base plane transverse to the spinal axis, a mount secured to the neck assembly and coupled to the base with the spinal axis passing through the mount, a pivot mechanism having a first portion secured to the base and a second portion secured to the mount, wherein the mount has an upper surface and a lower surface with the upper surface of the mount angled relative to the lower surface of the mount to define a wedge-shaped configuration, said method comprising the steps of:

positioning the anthropomorphic test device with the spinal plane angled at an initial spinal angle relative to a vertical plane and with the head and neck assemblies positioned in a desired one of a plurality of head positions relative to the vertical plane; wherein the mount is positioned at an initial mounting angle relative to a base plane with at least one of the upper and lower surfaces of the mount angled relative to the base plane;

repositioning the anthropomorphic test device such that the spinal plane angle increases from the initial spinal angle to a repositioned spinal angle relative to the vertical plane; and pivoting the mount relative to the base to adjust the mounting angle from the initial mounting angle to a second mounting angle to maintain the neck and head assembly of the repositioned anthropomorphic test device in the desired one of the plurality of head positions relative to the vertical plane at the repositioned spinal angle while maintaining the anthropomorphic test device at the repositioned spinal angle and with at least one of the upper and lower surfaces of the mount angled relative to the base plane.

15. The method of claim 14 further comprising securing the mount to the base with the angle of the mount relative to the base plane at the second angle.

16. The method of claim 14, wherein the initial spinal angle is 23 degrees relative to the vertical plane, and wherein the repositioned spinal angle is greater than 23 degrees and less than 90 degrees relative to the vertical plane.

17. The method of claim 14, wherein the initial spinal angle is 23 degrees relative to the vertical plane, and wherein the repositioned spinal angle is from 43 to 60 degrees relative to the vertical plane.

18. The method of claim 14, further comprising:

coupling another pivot mechanism coupled between the head assembly and the neck assembly; and pivoting the head assembly relative to the neck assembly.

* * * * *